(12) United States Patent
Ueda

(10) Patent No.: US 9,438,151 B2
(45) Date of Patent: Sep. 6, 2016

(54) TRANSVERSE FLUX MACHINE AND VEHICLE

(71) Applicant: KABUSHIKI KAISHA TOSHIBA, Tokyo (JP)

(72) Inventor: Yasuhito Ueda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 14/017,897

(22) Filed: Sep. 4, 2013

(65) Prior Publication Data

US 2014/0139161 A1 May 22, 2014

(30) Foreign Application Priority Data

Nov. 20, 2012 (JP) ................. 2012-254749

(51) Int. Cl.
*H02K 21/12* (2006.01)
*H02K 1/27* (2006.01)
(Continued)

(52) U.S. Cl.
CPC ............... *H02P 6/16* (2013.01); *B60L 11/123* (2013.01); *B60L 11/14* (2013.01); *B60L 11/1803* (2013.01); *B60L 15/007* (2013.01); *B60L 15/20* (2013.01); *H02K 21/125* (2013.01); *H02P 6/00* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *H02K 2201/12* (2013.01); *Y02T 10/6217* (2013.01); *Y02T 10/641* (2013.01); *Y02T 10/644* (2013.01);
(Continued)

(58) Field of Classification Search
CPC .................................... H02K 2201/12
USPC ............................. 310/156.02, 253
See application file for complete search history.

(56) References Cited

U.S. PATENT DOCUMENTS 5,051,641 A * 9/1991 Weh .................. H02K 1/27
310/162
5,289,072 A * 2/1994 Lange ............... H02K 21/125
310/112

(Continued)

FOREIGN PATENT DOCUMENTS

| CN | 101772880 | 7/2010 |
|---|---|---|
| CN | 102545500 | 7/2012 |

(Continued)

OTHER PUBLICATIONS

Office Action from the State Intellectual Property of the People's Republic of China mailed Oct. 23, 2015, for the counterpart Chinese Patent Application No. 20130608322.X. and English translation thereof (24 pages total).

*Primary Examiner* — Burton Mullins
(74) *Attorney, Agent, or Firm* — Finnegan, Henderson, Farabow, Garrett & Dunner, LLP

(57) ABSTRACT

A transverse flux machine includes a stator having a circular coil wound in a rotational direction and a rotor arranged to face the first ferromagnet across a gap. The stator has a plurality of first ferromagnets surrounding a part of the circular coil in the rotational direction separately. The rotor is rotatable about a center axis of the circular coil relative to the stator. The rotor has a plurality of second ferromagnets arranged in the rotational direction separately. A first member and a second member are inserted between adjacent ones of the second ferromagnets. The first member and the second member generate two magnetic fields opposite to each other in the circumference direction.

20 Claims, 35 Drawing Sheets

(51) Int. Cl.
*H02P 6/16* (2016.01)
*H02P 6/00* (2016.01)
*B60L 11/12* (2006.01)
*B60L 11/14* (2006.01)
*B60L 11/18* (2006.01)
*B60L 15/00* (2006.01)
*B60L 15/20* (2006.01)

(52) U.S. Cl.
CPC ........... *Y02T10/645* (2013.01); *Y02T 10/7005* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 5,773,910 A * | 6/1998 | Lange | H02K 1/27 310/156.02 |
| 7,560,840 B2 * | 7/2009 | Lange | H02K 21/125 310/156.02 |
| 7,859,141 B2 * | 12/2010 | Sadarangani | H02K 21/125 310/12.24 |
| 2009/0009022 A1 | 1/2009 | Saint-Michel | |
| 2012/0161551 A1 | 6/2012 | Miyamoto et al. | |
| 2012/0228965 A1 * | 9/2012 | Bang | F03D 9/002 310/12.18 |
| 2012/0249035 A1 * | 10/2012 | Ueda | B60K 6/445 318/400.41 |

FOREIGN PATENT DOCUMENTS

| | | |
|---|---|---|
| CN | 102736990 | 10/2012 |
| EP | 2 187 508 | 5/2010 |
| FR | 2 744 856 | 8/1997 |

* cited by examiner

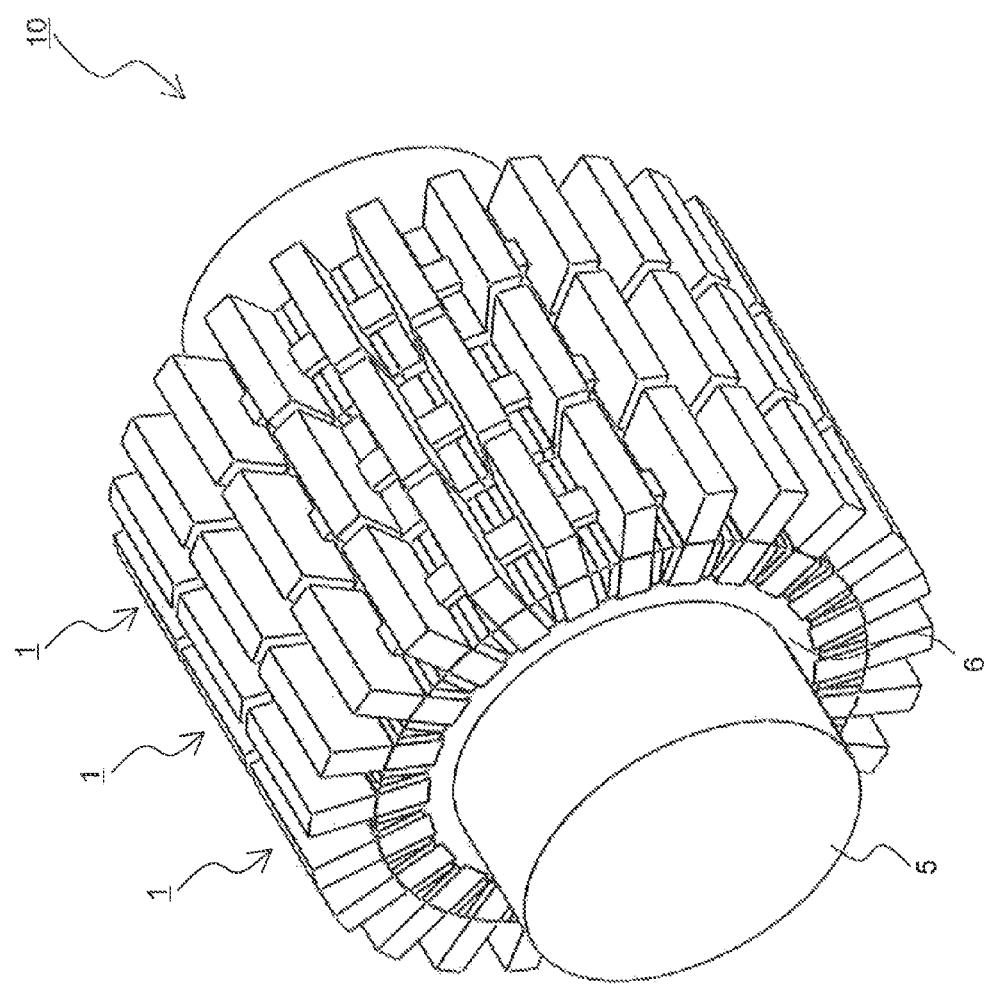

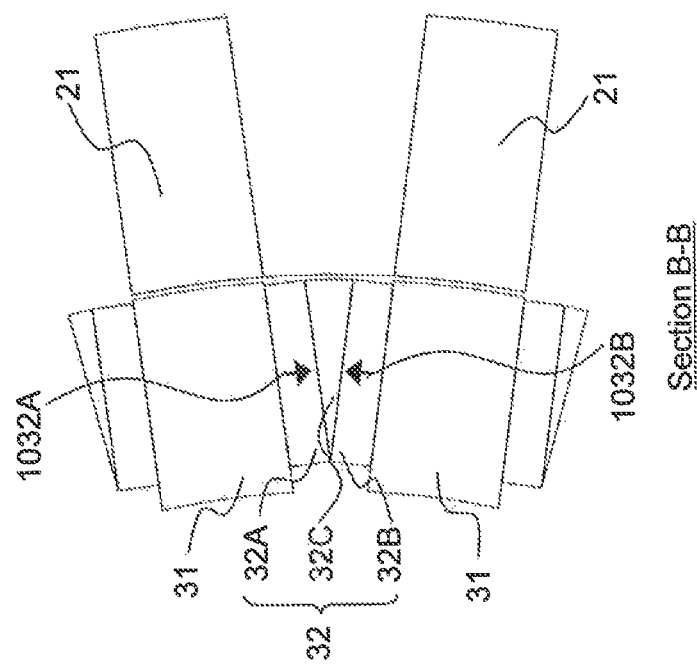

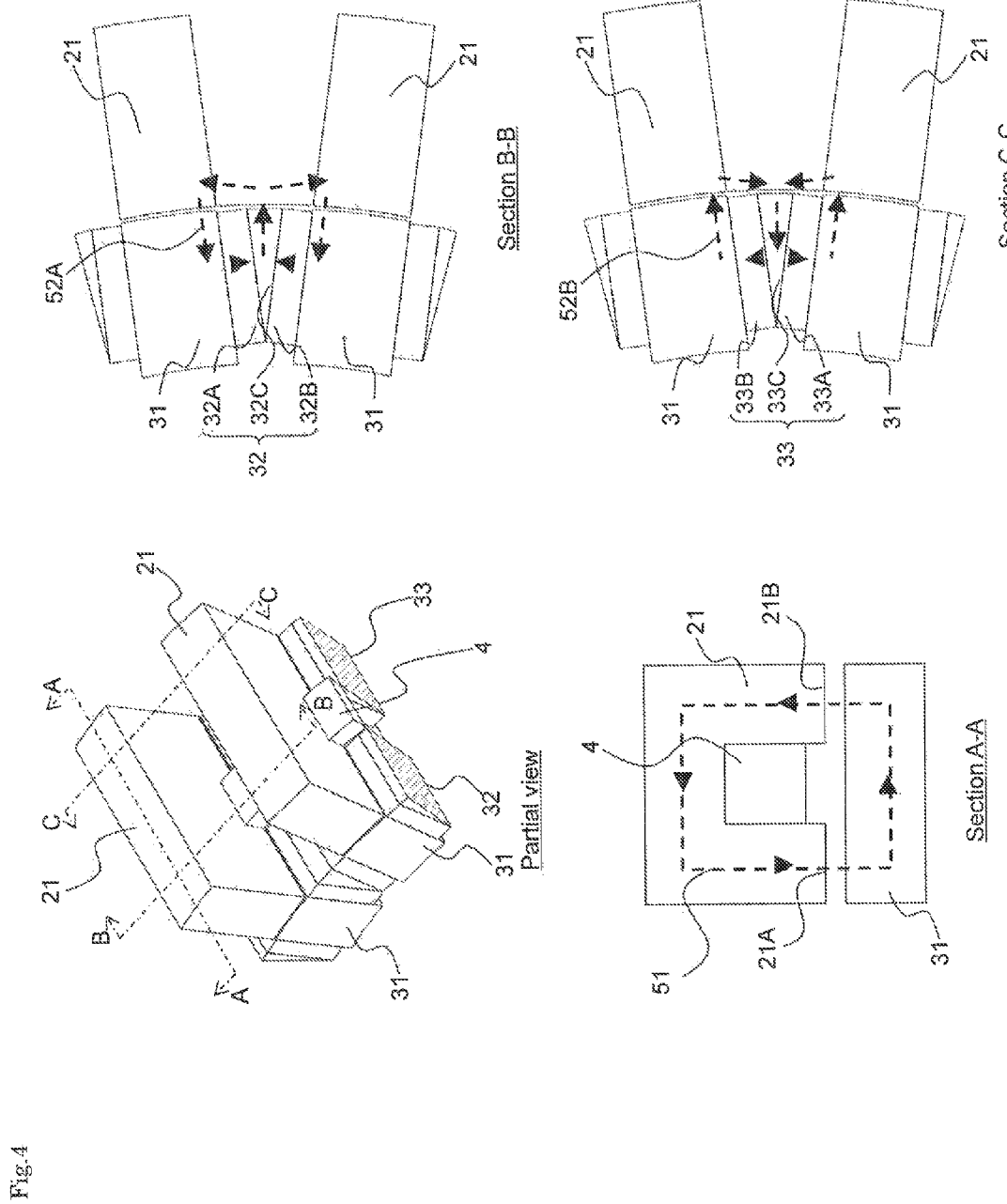

TRANSVERSE FLUX MACHINE AND VEHICLE

CROSS-REFERENCE TO RELATED APPLICATION

This application is based upon and claims the benefit of priority from Japanese Patent Application No. 2012-254749, filed on Nov. 20, 2012; the entire contents of which are incorporated herein by reference.

FIELD

Embodiments described herein relate generally to a transverse flux machine and a vehicle using the same.

BACKGROUND

A transverse flux machine has a rotor which is rotatable about an axis, and a stator surrounding the rotor. The stator has a circular coil wound coaxially with the rotor, and a plurality of U-shaped magnet cores surrounding the coil and arranged on a circumference. The U-shaped magnet cores have a magnetic polarity at both ends. The rotor has permanent magnets and magnet cores on a circumference alternately. The permanent magnets and the magnet cores are arranged to face the magnetic polarity of the U-shaped magnet cores.

BRIEF DESCRIPTION OF THE DRAWINGS

FIG. 1 shows an oblique view of a transverse flux machine according to a first embodiment.

FIGS. 3B, 3C and 3D show cross-sectional views of the driving component of FIG. 3A.

FIG. 4 shows a schematic diagram showing magnetic flux flows according to the first embodiment.

DETAILED DESCRIPTION

Figure 2A:
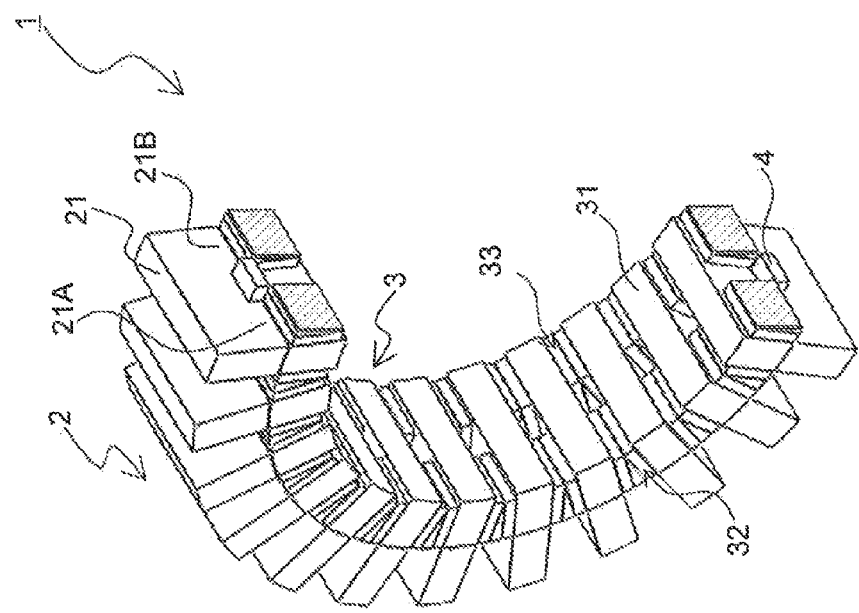
FIG. 2A shows an oblique view of a driving component of FIG. 1.

In the transverse flux machine, torque is generated by supplying polyphase current to the circular coils. Here, generally, high torque can be achieved by generating multipole magnetic fields with more permanent magnets and magnet cores. However, further higher torque is desired.

In an aspect of one embodiment as shown below, a transverse flux machine realizing high torque and a vehicle using the same can be provided.

According to an aspect of a certain embodiments, there is provided a transverse flux machine comprising: a stator having a circular coil wound in a rotational direction, and a plurality of first ferromagnets surrounding a part of the circular coil in the rotational direction separately; and a rotor arranged to face the first ferromagnets with a gap, and the rotor is rotatable about a center axis of the circular coil relative to the stator; wherein the rotor has a plurality of second ferromagnets arranged in the rotational direction separately; a first member and a second member, inserted between the adjacent second ferromagnets, the first member and the second member generate two magnetic fields opposite each other in the circumference direction.

According to an aspect of other embodiments, a vehicle including the transverse flux machine is provided.

Hereinbelow, embodiments will be explained in further detail with reference to the drawings.

[First Embodiment]

A transverse flux machine 10 according to a first embodiment is explained with FIGS. 1 to 6. In FIGS. 1 and 2, the transverse flux machine 10 has a plurality of driving components 1 in which a relative phase of a stator 2 and a rotor 3 in a rotational direction differs, along a driving axis 5. In this case, three sets of the driving components 1 are connected with the driving axis 5 by the medium of a bearing member 6. Here, mechanical output (Torque) is transmitted through the driving axis 5.

Figure 2B:
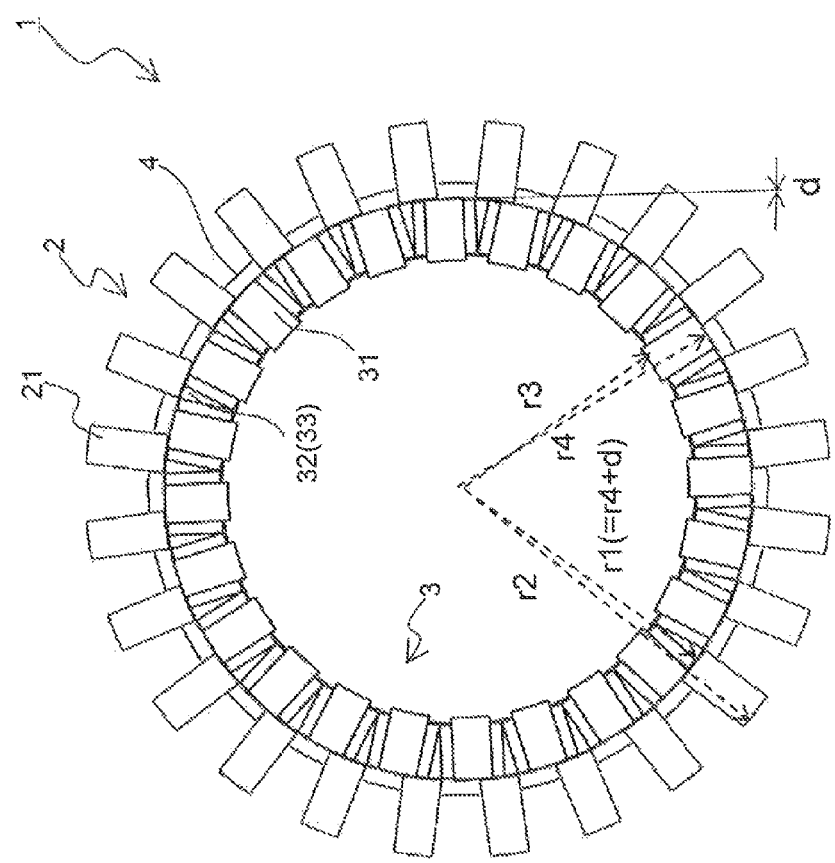
FIG. 2B shows a front view of a driving component of FIG. 1.

In FIGS. 2A and 2B, each driving component 1 has the stator 2, and the rotor 3 arranged to face the inner circumference of the stator 2 with a gap d. The rotor 3 is rotatable about the driving axis 5 as a rotational axis relatively to the stator 2.

The stator 2 has a circular coil 4 wound in a circumferential direction (rotational direction) on which a virtual cylinder that is placed at a distance (r1) from the rotational axis, and a plurality of magnet cores of the stator 2 (a first ferromagnet) 21 surrounding a part of the coil 4 in a circumferential direction (rotational direction) separately. Each magnet core 21 has a U-shaped form. Furthermore, the magnet core 21 has a first magnetic pole portion 21A and a second magnetic pole portion 21B in arms of the U-shaped form. The magnet core 21 holds the coil between the first magnetic pole portion 21A and the second magnetic pole portion 21B.

The rotor 3 has a plurality of magnet cores 31 of the rotor 3 (a second ferromagnet) in a circumferential direction (rotational direction) on which a virtual cylinder that is placed at a distance (r2) from the rotational axis, separately. Furthermore, the rotor 3 has a first inserted member 32 and a second inserted member 33, which are inserted between the adjacent magnet cores 31. The first inserted member 32 is arranged so that the place of the first inserted member 32 in the direction of the rotational axis corresponds to the first magnetic pole portion 21A. According to rotation of the rotor 3, the first magnetic pole portion 21A faces the magnet core 31. Here, a closed magnetic circuit between the magnet core 21 and the magnet core 31 is formed by the medium of the first inserted member 32 as described below. The second inserted member 33 is arranged so that the place of the second inserted member 33 in the direction of the rotational axis corresponds to the second magnetic pole portion 21B. According to rotation of the rotor 3, the second magnetic pole portion 21B faces the magnet core 31. Here, a closed magnetic circuit between the magnet core 21 and the magnet core 31 is formed by the medium of the second inserted member 33 as described below.

Figure 3A:
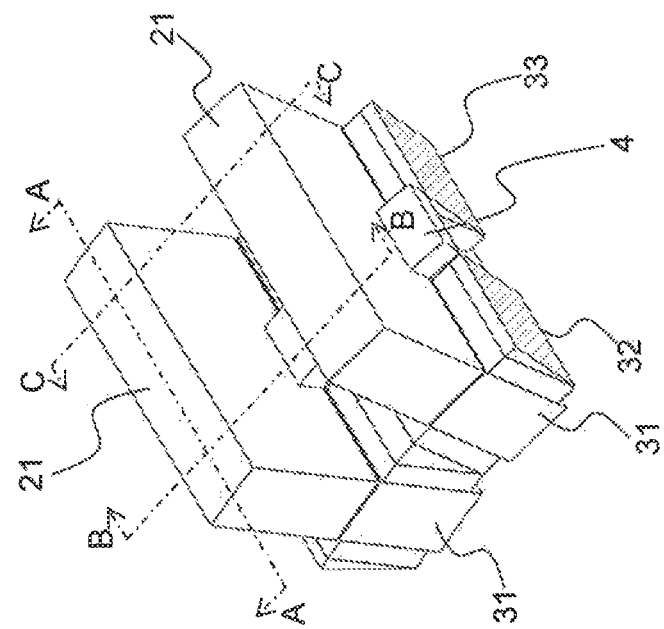
FIG. 3A shows a partial view of the driving component of FIG. 2.
Figure 3B:
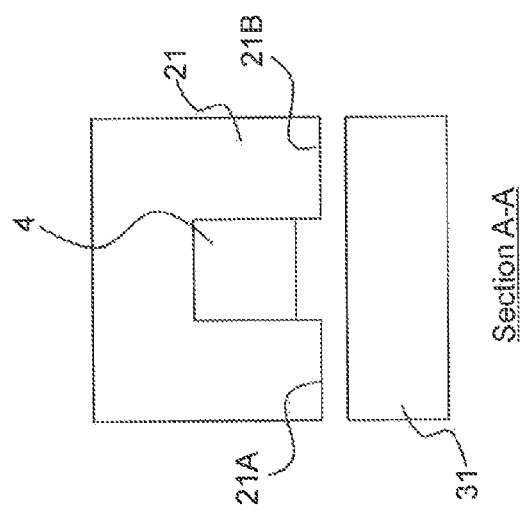
Figure 3D:
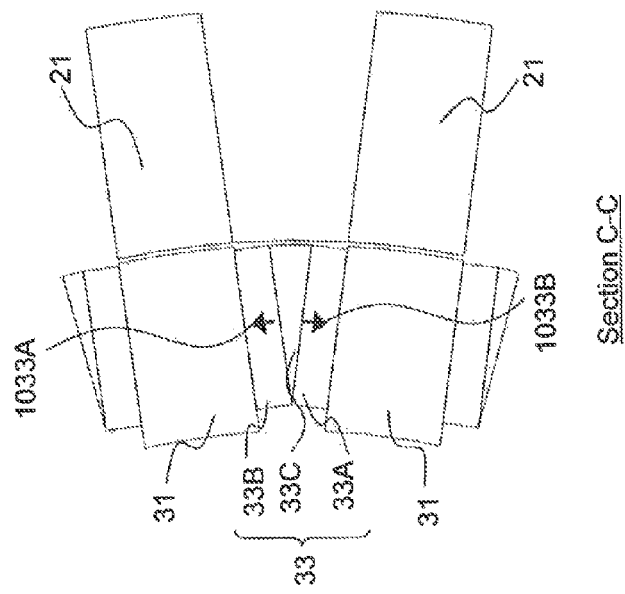

FIGS. 3A-3D show an example of the driving component 1 at a time when the magnet core 21 and the magnet core 31 are faced to each other according to rotation of the rotor 3. FIG. 3A is a partial view of the driving component 1. FIGS. 3B, 3C, and 3D are cross-sectional views of the driving component 1 along A-A, B-B, and C-C of FIG. 3A. The first inserted member 32 generates two magnetic fields opposite each other in the circumference direction. The first inserted member 32 has a first magnet (a first member) 32A and a second magnet (a second member) 32B, which are arranged separately in the circumference direction. Furthermore, the first inserted member 32 has a ferromagnet (a third ferromagnet) 32C arranged between the first magnet 32A and the second magnet 32B. The first magnet 32A and the second magnet 32B are permanent magnets fixed on the sides of the adjacent magnet cores 31 by, for example, adhesive. The second inserted member 33 generates two magnetic fields opposite each other in the circumference direction. The second inserted member 33 has a third magnet (a third magnetic field generating member) 33A and a fourth magnet (a fourth magnetic field generating member) 33B, which are arranged separately in the circumference. Furthermore, the second inserted member 33 has a ferromagnet (a fourth ferromagnet) 33C arranged between the third magnet 33A and the fourth magnet 338. The third magnet 33A and the fourth magnet 33B are permanent magnets fixed on the sides of the adjacent magnet cores 31 by, for example, adhesive.

In FIG. 3C, the first magnet 32A generates a magnetic field in a magnetizing direction 1032A which is from the side of the adjacent magnet core 31 to the ferromagnet 32C. The second magnet 32B generates a magnetic field in a magnetizing direction 1032B which is from the side of the adjacent magnet core 31 to the ferromagnet 32C. The magnetizing direction 1032A and the magnetizing direction 1032B are opposite direction to each other in the circumference direction.

In FIG. 3D, the third magnet 33A generates a magnetic field in a magnetizing direction 1033A which is from the ferromagnet 33C to the side of the adjacent magnet core 31. The fourth magnet 33B generates a magnetic field in a magnetizing direction 1033B which is from the ferromagnet 33C to the adjacent magnet core 31. The magnetizing direction 1033A and the magnetizing direction 1033B are opposite direction to each other in the circumference direction.

Furthermore, each of the first magnet 32A, the second magnet 32B, the third magnet 33A, and the fourth magnet 33B generates magnetic field in a magnetizing direction approximately perpendicular to the side of the magnet core 31, preferably. However, the magnetizing directions of the magnets are not limited as above.

Furthermore, a permanent magnet magnetized beforehand may be used for the material of the first magnet 32A, the second magnet 32B, the third magnet 33A, and the fourth magnet 33B. A combination of a magnet core and a coil wound around the magnet core, for example, may also be used for the material of the first magnet 32A, the second magnet 32B, the third magnet 33A, and the fourth magnet 33B. In these magnets 32A, 32B, 33A, 33B, magnetic field may be generated by supplying current to the coil.

[Operations of the First Embodiment]

Operations in generating torque in the first embodiment will be explained while referring to FIG. 4. In the cross-sectional view of the driving component 1 along A-A of FIG. 4, current in the circular coil 4 flows in a direction out of this figure.

Firstly, by causing the excitation by supplying the current in the circular coil 4, magnetic flux flow (magnetic circuit) 51 in a path of the magnet core 21, the magnet core 31, the magnet core 21 is formed. Here, by the magnetic fields of the first magnet 32A and the second magnet 32B, magnetic flux flow (magnetic circuit) 52A in a path of the first magnet 32A, the ferromagnet 32C, the magnet core 21, the magnet core 31, the first magnet 32A, and in a path of the second magnet 32B, the ferromagnet 32C, the magnet core 21, the magnet core 31, and the second magnet 32B are formed. Moreover, by the magnetic fields of the third magnet 33A and the fourth magnet 33B, magnetic flux flow (magnetic circuit) 52B in a path of the third magnet 33A, the magnet core 31, the magnet core 21, the ferromagnet 33C, and the third magnet 33A, and in a path of the fourth magnet 33B, the magnet core 31, the magnet core 21, and the fourth magnet 33B are formed. The magnetic circuits 51, 52A, 52B interact with each other, and as a result, torque is generated in the rotor 3.

Torque generated in the transverse flux machine 10 is represented as formula of partial differentiation of the magnetic energy stored in the gap between the stator 2 and the rotor 3 ($B^2/2\ \mu_0$) with respect to the rotation angle of the rotor 3 ($\theta$). Moreover, B is magnetic flux density, $\mu_0$ is absolute permeability of vacuum. Here, by generating multipole magnetic field, high torque can be achieved because the denominator of the above formula of partial differentiation ($\partial\theta$) decreases.

Figure 25A:
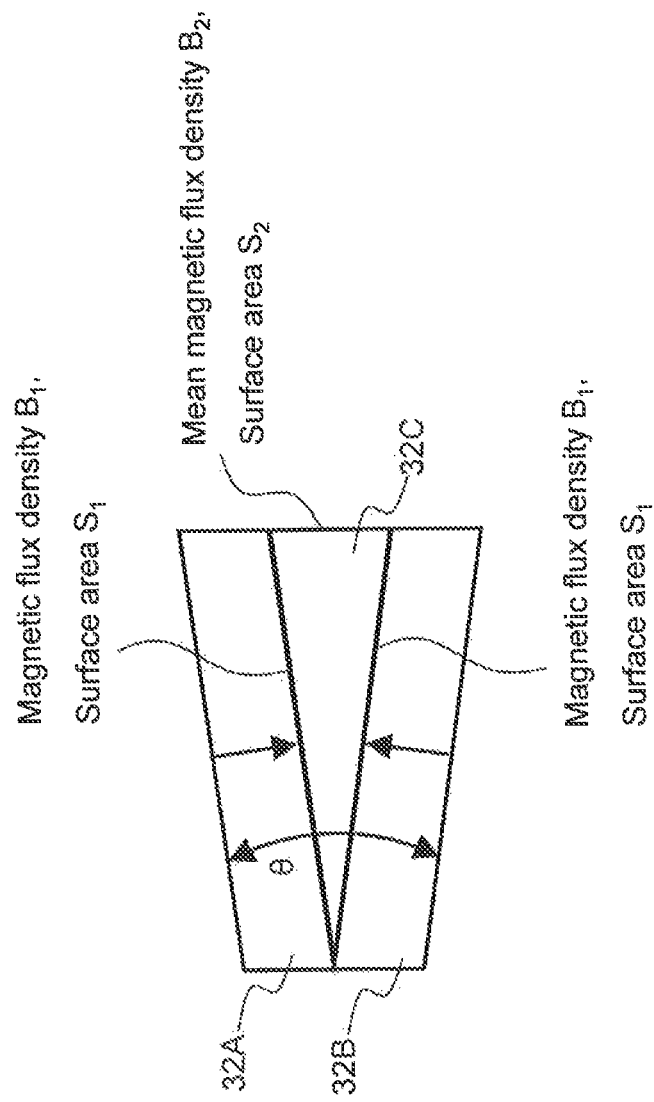
FIGS. 25A and 25B show a drawing showing a comparative example of the transverse flux machine according to the first embodiment.
Figure 25B:
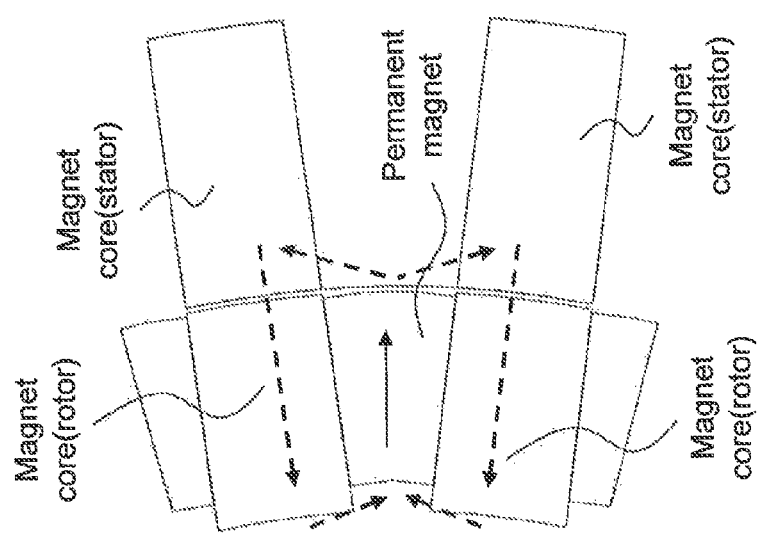

FIG. 25A shows the first embodiment, and FIG. 25B shows a comparative example. In FIG. 25A, each of magnetic flux density of the first magnet 32A (or the third magnet 33A) and the second magnet 32B (or the fourth magnet 33B) is $B_1$, and each of surface area of those magnets is $S_1$. Surface area near the stator 2 of the first inserted member 32 (or the second inserted member 33) is $S_2$. Here, the mean magnetic flux density at the surface near the stator 2 of the first inserted member 32 (or the second inserted member 33) $B_2$ is represented as $2B_1S_1/S_2$. According to the transverse flux machine 10, because each of the magnets 32A, 32B, 33A, 33B generating the magnetic field approximately perpendicular to the side of the magnet core 31 are arranged between the adjacent magnet cores 31, the surface area 81 perpendicular to each of magnetizing direction of the magnets 32A, 32B, 33A, 33B is expanded to the lateral area of the magnet core 31. Therefore, the mean magnetic flux density $B_2$ increases, and higher torque can be achieved, compared with the comparative example as shown in FIG. 25B.

Furthermore, according to the transverse flux machine 10, because the first magnet 32A (or the third magnet 33A) and the second magnet 32B (or the fourth magnet 33B) generate two magnetic fields opposite to each other in the circumference direction, a magnetic field is formed in the radial direction in the ferromagnet 32C (or the ferromagnet 33C) by repelling of the two magnetic fields. Therefore, substantially all magnetic flux flow forms in the radial direction, and high magnetic flux density can be achieved in the gap between the stator 2 and the rotor 3.

Furthermore, according to the transverse flux machine 10, the magnetic circuit 52A, 52B is shorter than the magnetic circuit according to the comparative example as shown in FIG. 25B, and substantially all magnetic flux flow forms in the ferromagnet. Therefore, magnetic resistance is low, and high magnetic flux density can be achieved even if magnetomotive force is low, and as a result, torque density can be improved.

[Modifications]

FIGS. 5A to 5F show modifications of the inserted member 32, 33. In FIGS. 5A to 5F, modifications of the first inserted member 32 are shown for example.

Figure 5A:
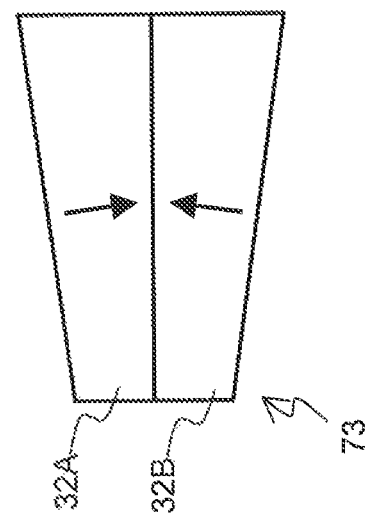
FIGS. 5A, 5B, 5C, 5D, 5E and 5F show drawings showing modifications of an inserted member of FIG. 2.

In FIG. 5A, an inserted member 73 has the first magnet 32A and the second magnet 32B, which touch each other. The magnetic flux concentrates at the contact surface of the first magnet 32A and the second magnet 32B, and the magnetic flux of the first magnet 32A and the second magnet 32B leaks toward the stator 2 or away from the stator 2. Therefore, the leakage magnetic flux is contributed for improving torque with a second stator arranged to face the inner circumference of the rotor 3.

Figure 5B:
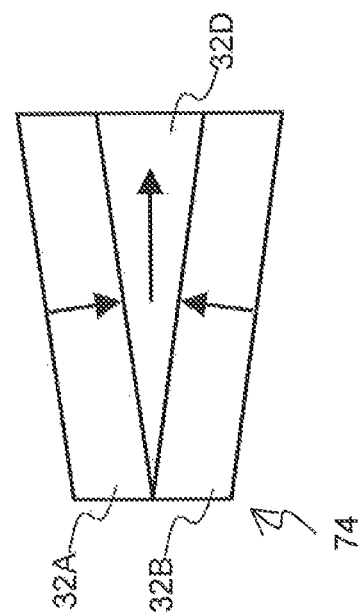

In FIG. 5B, an inserted member 74 has a fifth magnet 32D instead of the ferromagnet 32C of the first inserted member 32. The fifth magnet 32D generates a magnetic field in a magnetizing direction which is from the inner circumference of the rotor 3 to the outer circumference of the rotor 3. The magnetic flux flows by the first magnet 32A, the second magnet 32B and the fifth magnet 32D are strengthened, and a strong magnetic field is generated at the outer circumference of the fifth magnet 32D.

Figure 5C:
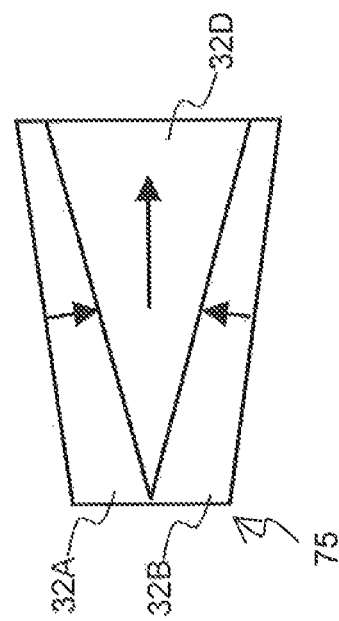

In FIG. 5C, an inserted member 75 has the first magnet 32A and the second magnet 32B, each of which has the shorter width of the outer circumference than the width of the inner circumference, and the fifth magnet 32D has the larger surface area of the outer circumference, for example, as compared to the fifth magnet 32D of the inserted member 74. Therefore, the distribution of the magnetic flux by the first magnet 32A, the second magnet 32B, and the fifth magnet 32D distributes in a rotational direction, and the harmonic distortion of the distribution decreases.

Figure 5D:
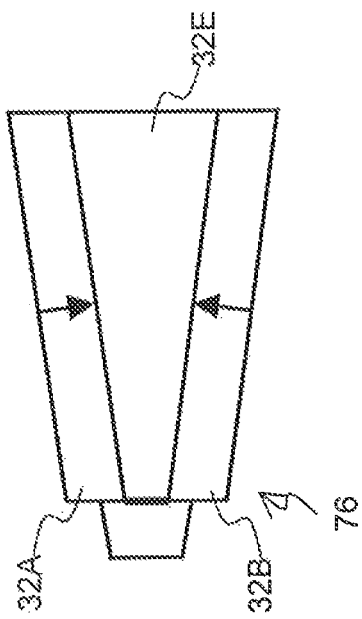

In FIG. 5D, an inserted member 76 has a ferromagnet 32E having a wider inner circumference, as compared to the ferromagnet 32C of the first inserted member 32. Therefore, the first magnet 32A and the second magnet 32B are installed to the ferromagnet 32E easily, and held tightly by the ferromagnet 32E. Here, the magnetic flux of the first magnet 32A and the second magnet 32B leaks away from the stator 2. Therefore, the leakage magnetic flux is contributed for improving torque with a second stator arranging to face the inner circumference of the rotor 3.

Figure 5E:
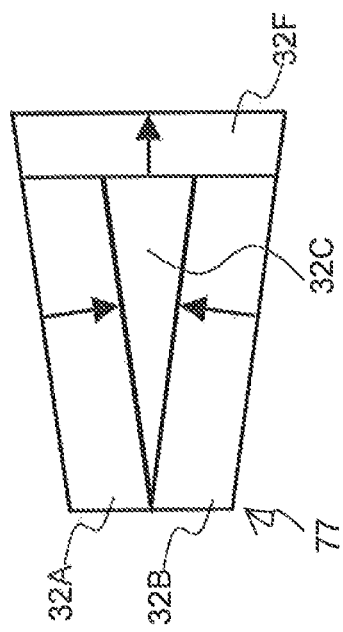

In FIG. 5E, an inserted member 77 has a sixth magnet 32F arranged in the outer circumference of the inserted member 77. The sixth magnet 32F generates a magnetic field in a magnetizing direction which is from the inner circumference of the rotor 3 to the outer circumference of the rotor 3. The sixth magnet 32F is arranged between the adjacent magnet cores 31. Therefore, the distribution of the magnetic flux by the sixth magnet 32F distributes in a rotational direction uniformly. Moreover, the magnetic flux of the first magnet 32A and the second magnet 32B flows through the ferromagnet 32C, and the magnetic flux density at the center of the sixth magnet 32F increases.

Figure 5F:
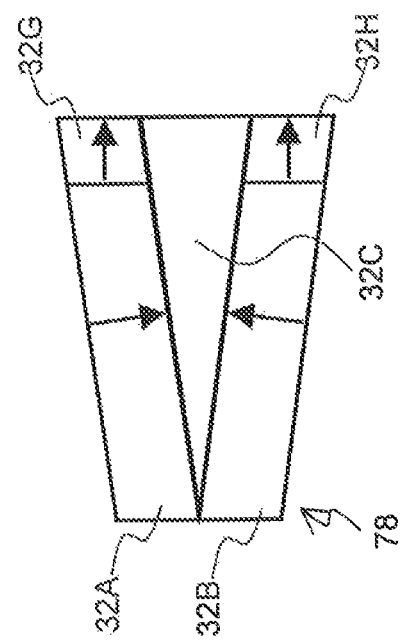

In FIG. 5F, an inserted member 78 has a seventh magnet 32G arranged in the outer circumference of the first magnet 32A, and an eighth magnet 32H arranged in the outer circumference of the second magnet 32B. The ferromagnet 32C is arranged between the seventh magnet 32G and the eighth magnet 32H. Therefore, the magnetic flux of the first magnet 32A and the second magnet 32B flows through the ferromagnet 32C, and the distribution of the magnetic flux by the seventh magnet 32G and the eighth magnet 32H distributes in a rotational direction uniformly.

Figure 6:
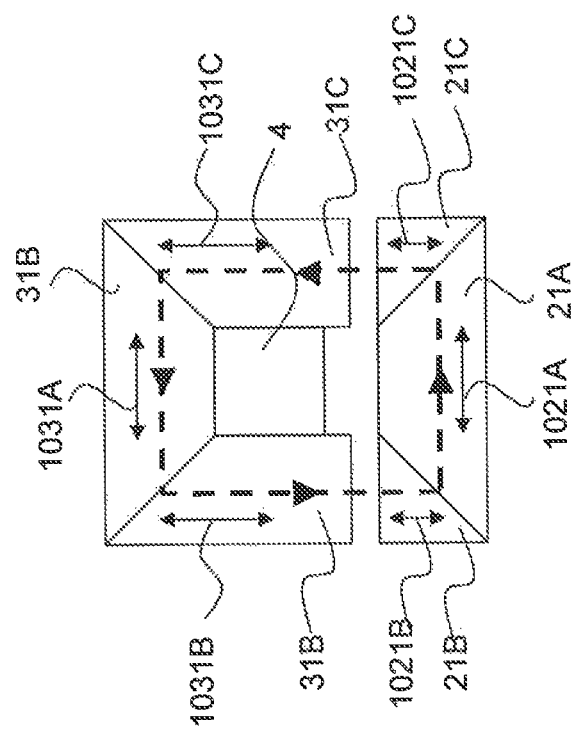
FIG. 6 shows a drawing showing a modification of magnet cores of a stator and a rotor of FIG. 2.

Furthermore, in FIG. 6, the magnet core 21 includes a plurality of components 21A, 21B, 21C, and the magnet core 31 includes a plurality of components 31A, 31B, 31C. Each of the components has easy axes of magnetization 1021A, 1021B, 1021C, and 1031A, 1031B, 1031C in the direction of the magnetic flux. Therefore, the magnetic flux density at the gap between the magnet core 21 and the magnet core 31 increases, as compared to an isotropic ferromagnet as the magnet core, and iron loss of the magnet core 21, 31 decreases.

[Second Embodiment]

FIG. 7 to 11 are drawings for explaining a transverse flux machine 110 according to a second embodiment. The transverse flux machine 110 has a plurality of driving components 101. Each of the driving components 101 has a rotor 103, an outer stator 102A, and an inner stator 102B.

Figure 7:
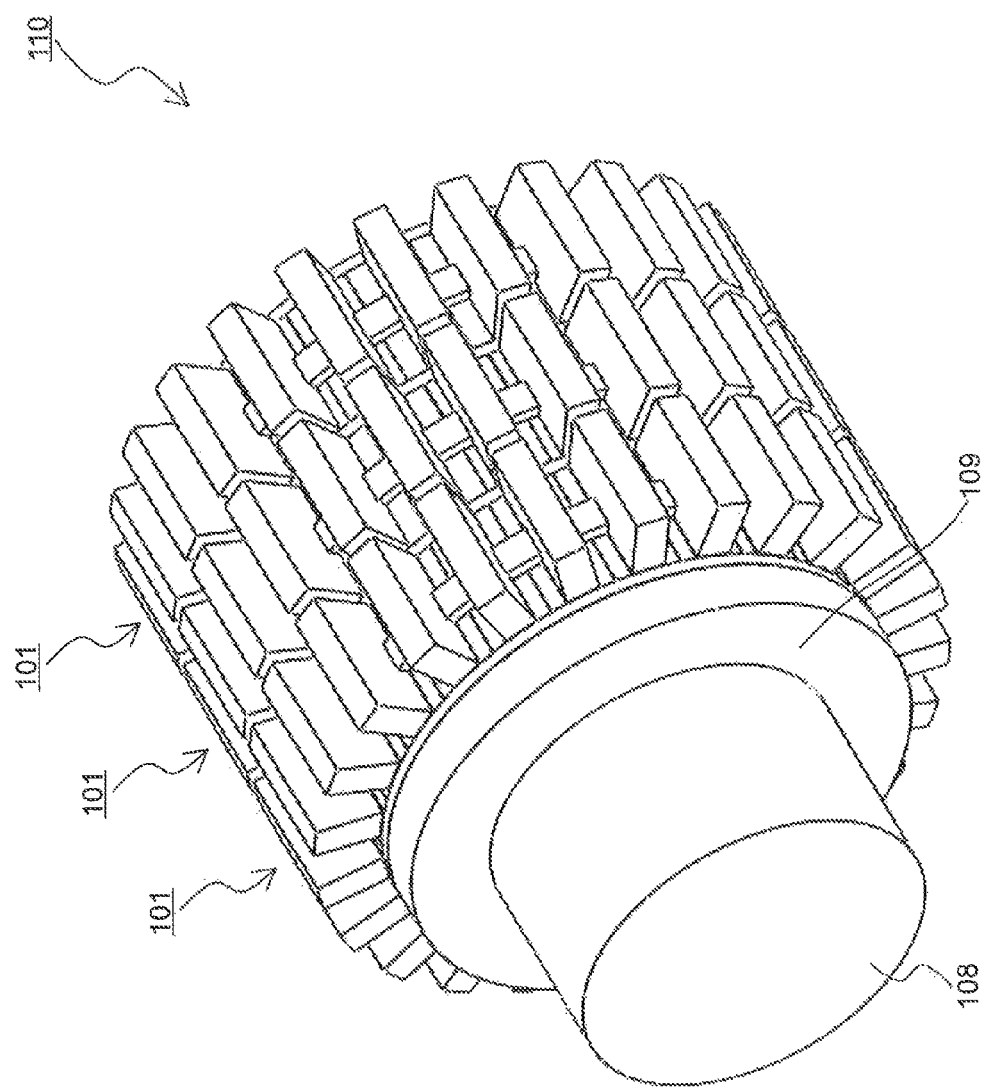
FIGS. 7, 8, 9, 10, and 11 show drawings showing a transverse flux machine according to a second embodiment.
Figure 8:
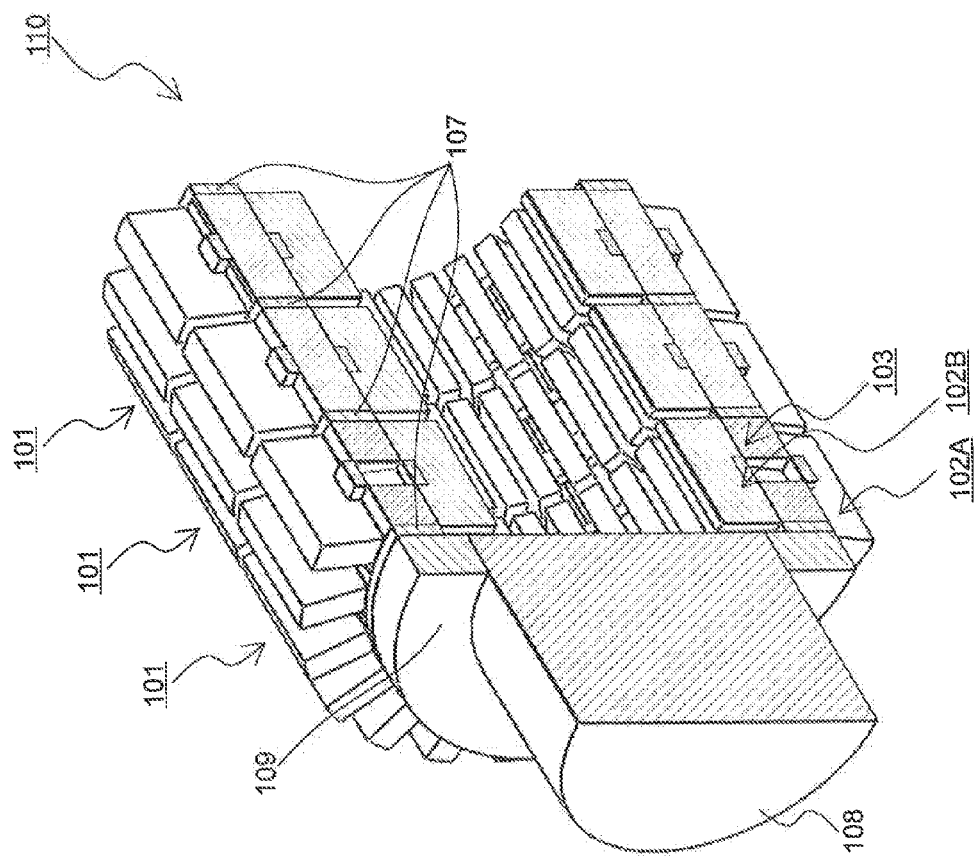

FIG. 7 is an oblique view of the transverse flux machine 110, and FIG. 8 is a cross-sectional view of the transverse flux machine 110 of FIG. 7 along a driving axis 108. In this case, three sets of the driving components 101 are connected with the driving axis 108 by the medium of a bearing member 107. Here, mechanical output (Torque) is transmitted through the driving axis 108.

Figure 9:
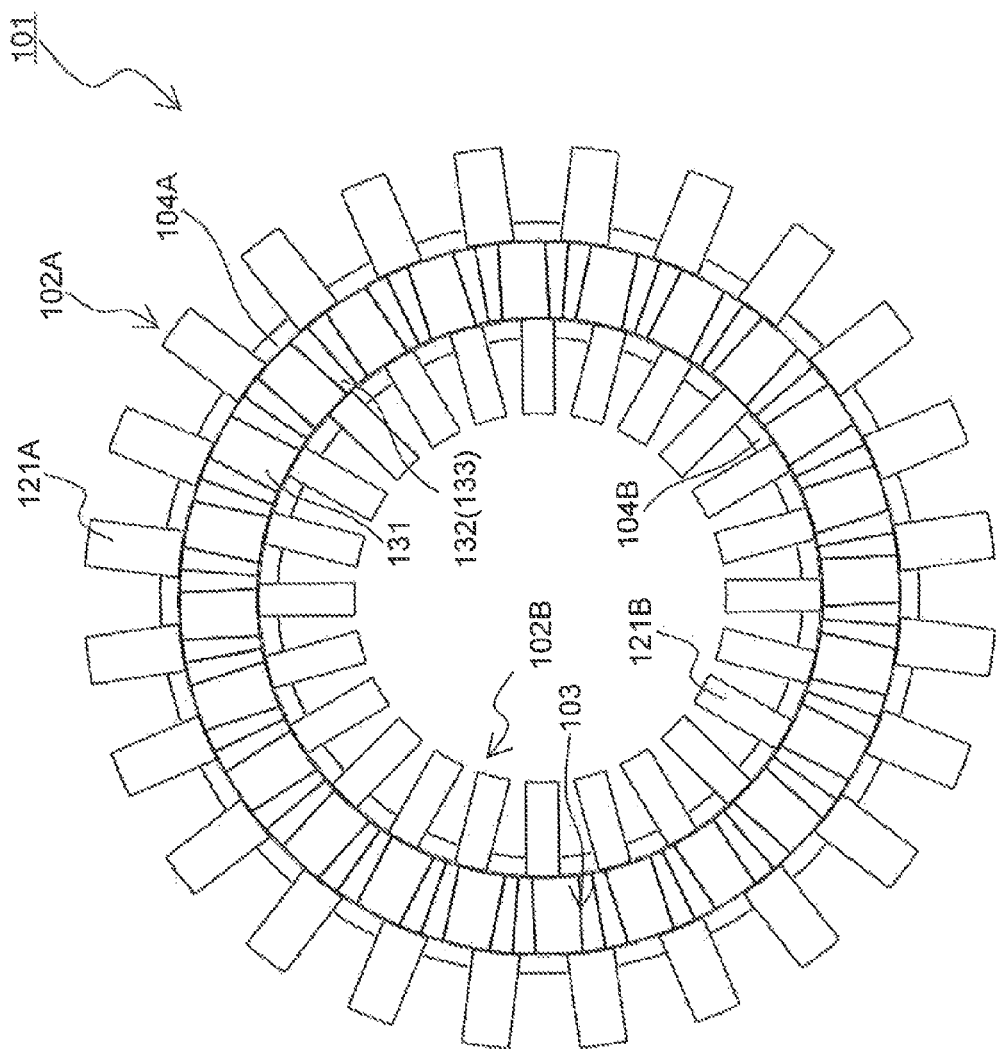
Figure 10:
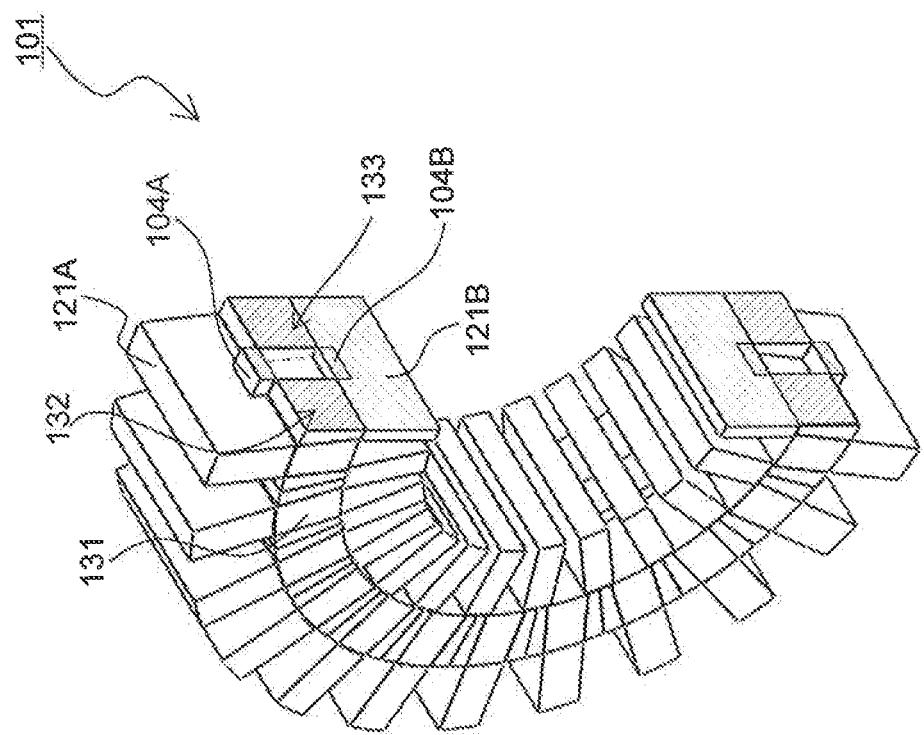

FIG. 9 and FIG. 10 show the driving component 101. The outer stator 102A is arranged to face the outer circumference of the rotor 103. The outer stator 102A has a circular coil 104A wound in a circumferential direction (rotational direction), and a plurality of magnet cores 121A of the outer stator 102A surrounding a part of the coil 104A in a circumferential direction (rotational direction) separately. The inner stator 102B is arranged to face the inner circumference of the rotor 103. The inner stator 102B has a circular coil 104B wound in a circumferential direction (rotational direction), and a plurality of magnet cores 121B of the inner stator 102B surrounding a part of the coil 104B in a circumferential direction (rotational direction) separately. Furthermore, the outer stator 102A and the inner stator 102B are arranged so that a relative phase of the magnet core 121A and the magnet core 121B in the rotational direction differs.

The rotor 103 has a plurality of magnet cores 131 of the rotor 103 in a circumferential direction (rotational direction) on which a virtual cylinder that is placed at a distance from the rotational axis, separately. Furthermore, the rotor 103 has a first inserted member 132 and a second inserted member 133, which are inserted between the adjacent magnet cores 131. The first inserted member 132 has a first magnet 132A and a second magnet 132B. The second inserted member 133 has a third magnet 133A and a fourth magnet 133B. Here, the rotor 103 is the same as the rotor 3, and the explanation of the detail on the rotor 103 is omitted.

[Operations of the Second Embodiment]

Figure 11:
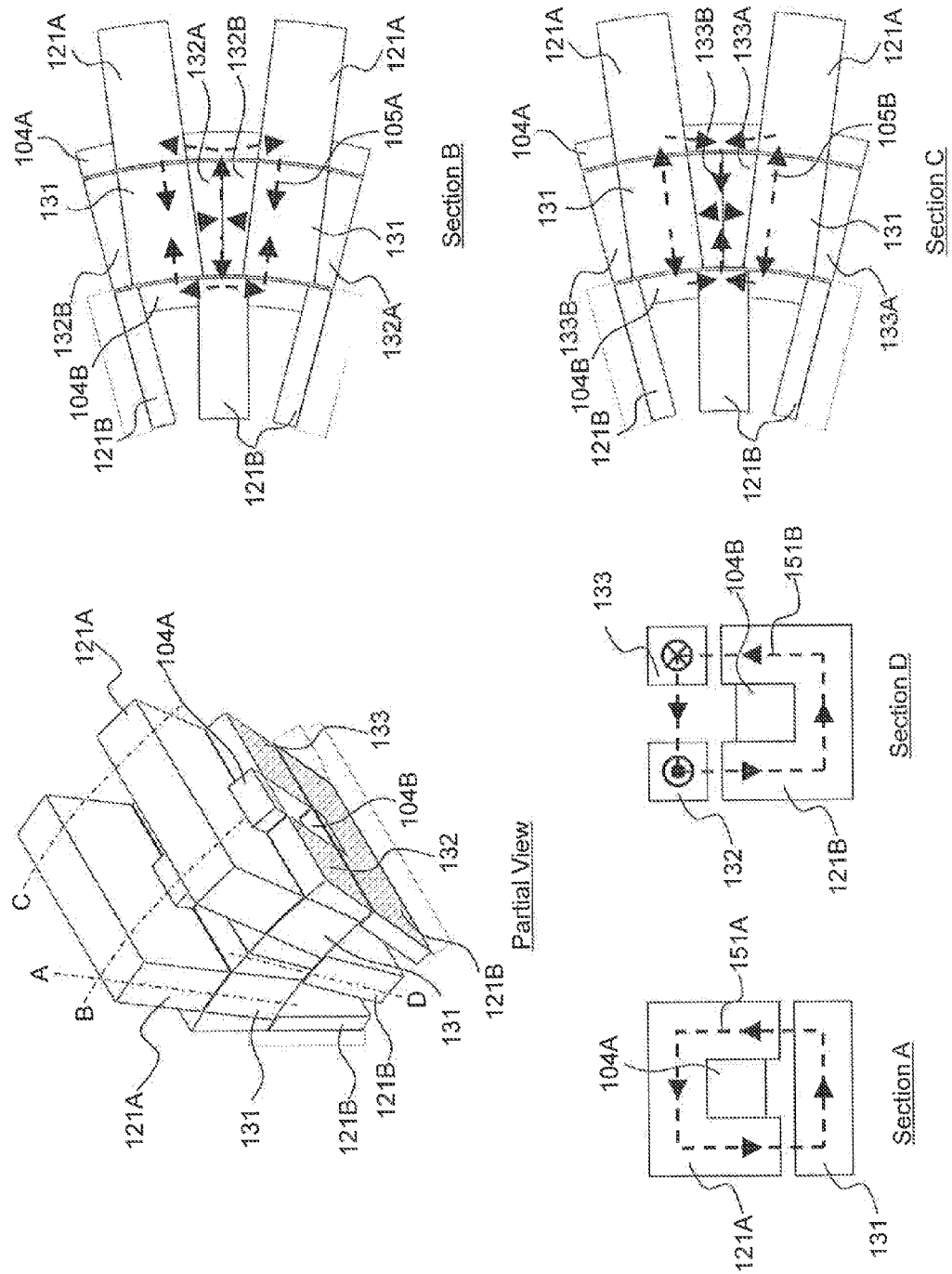

Operations in generating torque in the second embodiment will be explained while referring to FIG. 11. FIG. 11 shows a cross-sectional view of the driving component 101, and the magnetic flux flow.

Firstly, by causing the excitation by supplying the current in the circular coil 104A (or 104B), magnetic flux flow (magnetic circuit) 151A (or 151B) in a path of the magnet core 121A (or 121B), the magnet core 131, and the magnet core 121A (or 121B) is formed. Here, by the magnetic fields of the first magnet 132A, the second magnet 132B, the third magnet 133A and the fourth magnet 133B, magnetic flux flow (magnetic circuit) 105A (or 105B) is formed. The magnetic circuits 151A, 151B, 105A, 105B interact with each other, and as a result, torque is generated in the rotor 103.

According to the transverse flux machine 110, because the first magnet 132A (or the third magnet 133A) and the second magnet 132B (or the fourth magnet 133B) generate two magnetic fields opposite each other in the circumference direction, a magnetic field is formed in the radial direction by repelling of the two magnetic fields. Therefore, the magnetic flux flow forms toward the rotor 102A or the rotor 102B. Here, the magnetic flux flow forms toward the nearest magnet core 121A (or magnet core 121B) from each of the magnets, and the rate depends on the rotational position of the rotor 103). The magnetic resistance of the magnetic circuit 105 can be decreased, as compared to the first embodiment. Moreover, the magnetomotive force can be improved, and the higher torque can be achieved because the transverse flux machine 110 has two circular coils 104A, 104B.

[Third Embodiment]

FIGS. 12 to 16 are drawings for explaining a transverse flux machine 210 according to a third embodiment. The transverse flux machine 210 has a plurality of driving components 201. Each of the driving components 201 has a rotor 203, and two stators 202A, 202B. That is, the transverse flux machine 210 is an axial gap motor, although each of the transverse flux machine 10 (or 110) is a radial gap motor.

Figure 12:
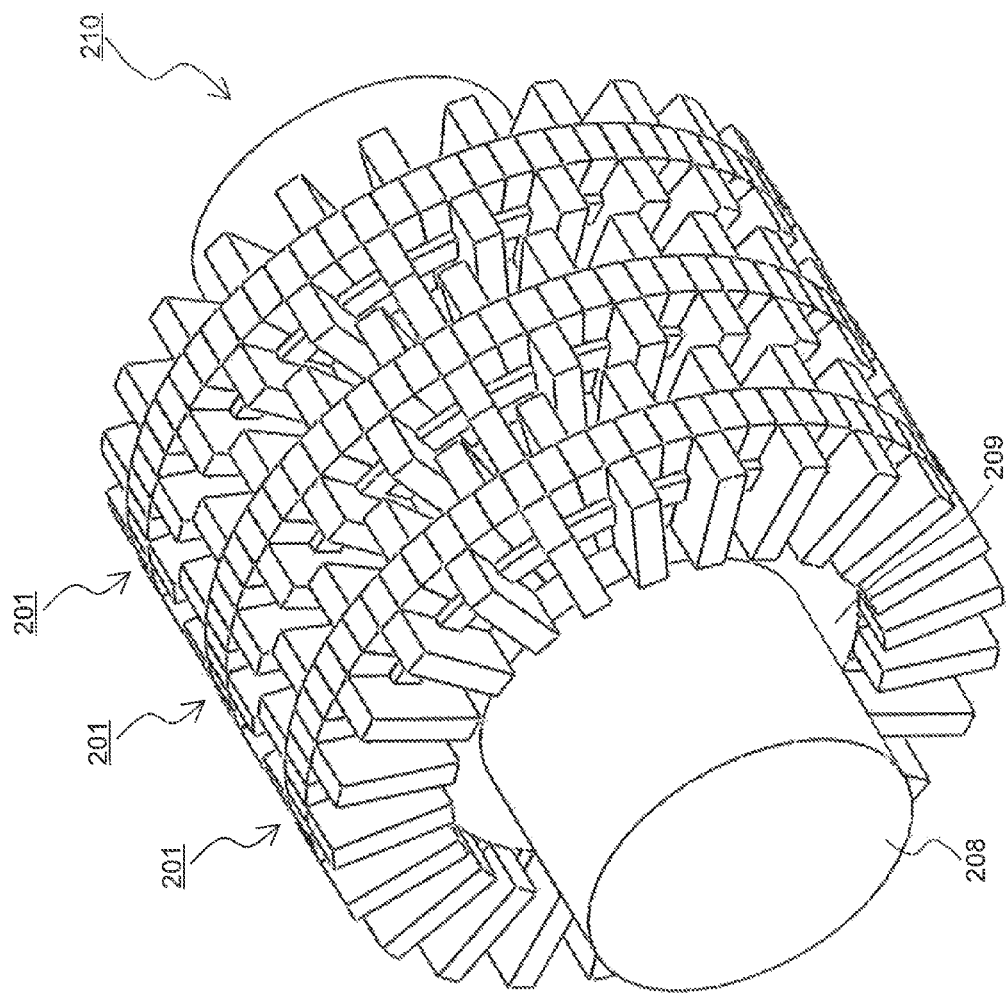
FIGS. 12, 13, 14, 15, and 16 show drawings showing a transverse flux machine according to a third embodiment.
Figure 13:
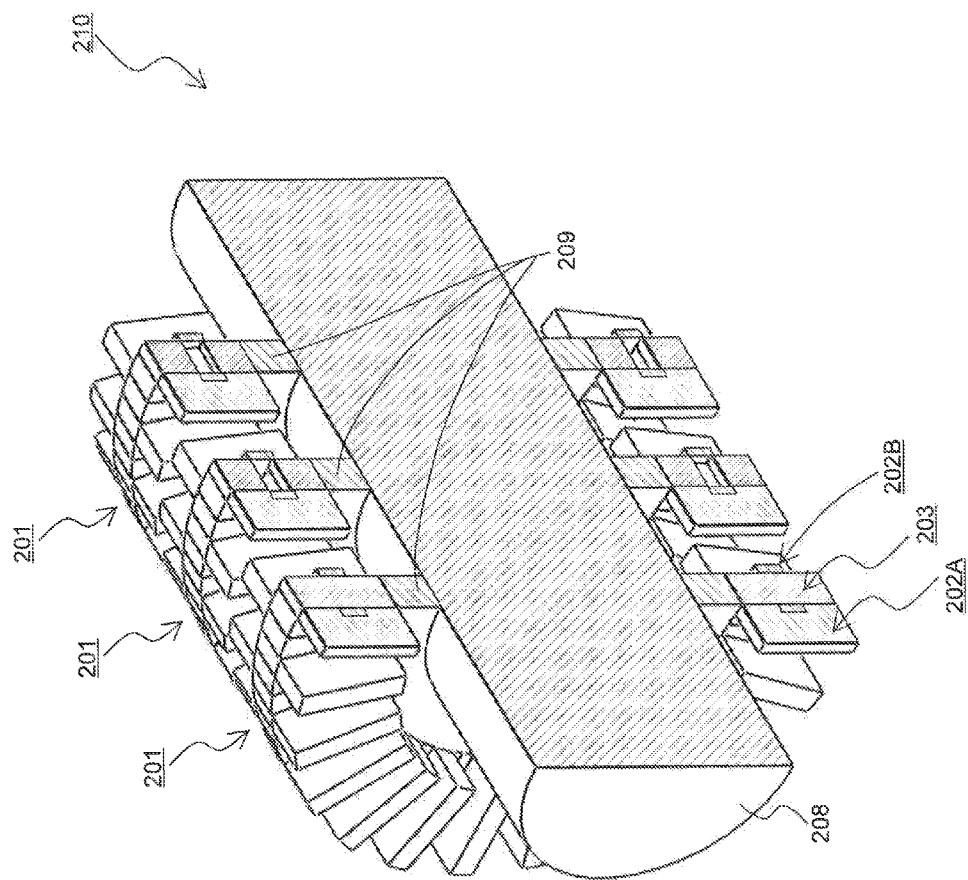

FIG. 12 is an oblique view of the transverse flux machine 210, and FIG. 13 is a cross-sectional view of the transverse flux machine 210 of FIG. 12 along the driving axis 208. In this case, three sets of the driving components 201 are connected with the driving axis 208 by the medium of a bearing member 209. Here, mechanical output (Torque) is transmitted through the driving axis 208.

Figure 14:
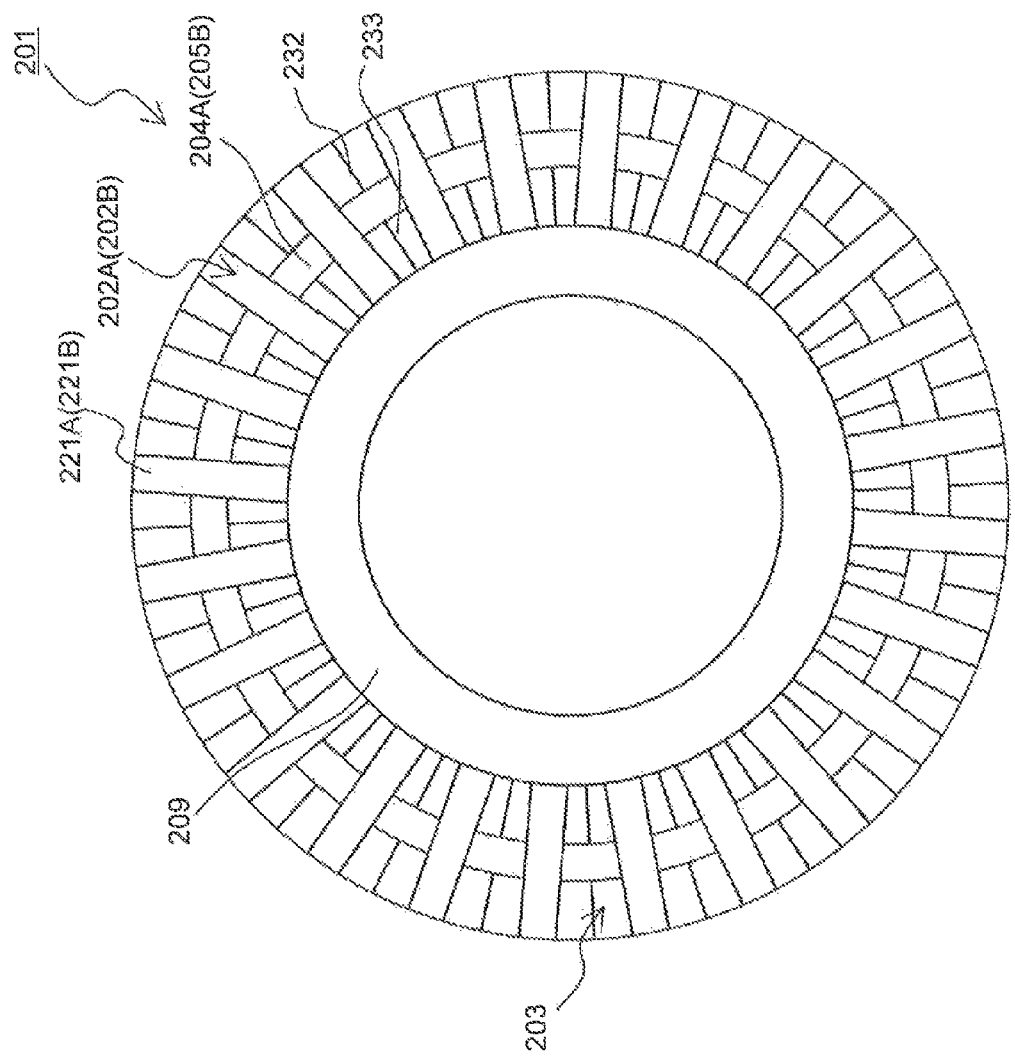
Figure 15:
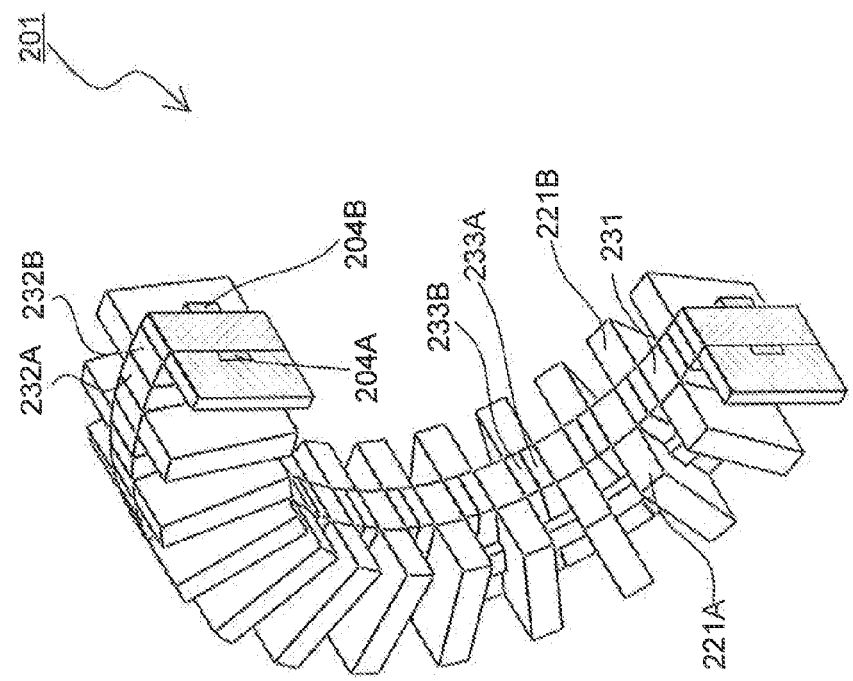

FIG. 14 and FIG. 15 show the driving component 201. The stator 202A is arranged to face the rotor 203 in the direction of the rotational axial. The stator 202A has a circular coil 204A wound in a circumferential direction (rotational direction), and a plurality of magnet cores 221A of the stator 202A surrounding a part of the coil 204A in a circumferential direction (rotational direction) separately. The stator 202B is arranged to face the rotor 203 in the direction of the rotational axis. The stator 202B has a circular coil 204B wound in a circumferential direction (rotational direction), and a plurality of magnet cores 221B of the stator 202B surrounding a part of the coil 204B in a circumferential direction (rotational direction) separately. Furthermore, the stator 202A and the stator 202B are arranged so that a relative phase of the magnet core 221A and the magnet core 221B in the rotational direction differs.

The rotor 203 has a plurality of magnet cores 231 of the rotor 203 in a circumferential direction (rotational direction) on which a virtual cylinder that is placed at a distance from the rotational axis, separately. Furthermore, the rotor 203 has a first inserted member 232 and a second inserted member 233, which are inserted between the adjacent magnet cores 231. The first inserted member 232 has a first magnet 232A and a second magnet 232B. The second inserted member 233 has a third magnet 233A and a fourth magnet 233B.

Here, the rotor 203 is the same as the rotor 3, and the explanation of the detail on the rotor 203 is omitted.

[Operations of the Third Embodiment]

Figure 16:
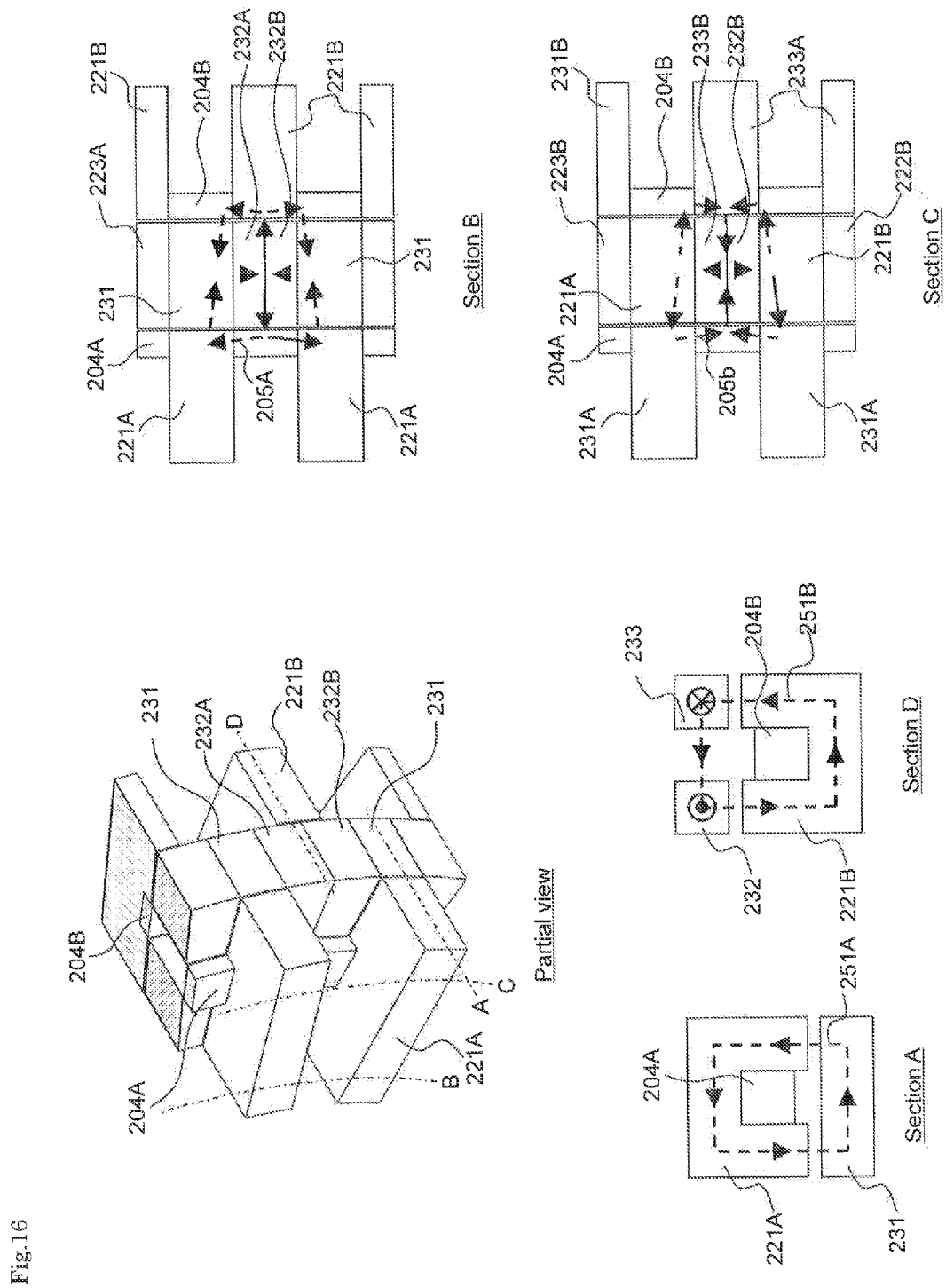

Operations in generating torque in the third embodiment will be explained while referring to FIG. 16. FIG. 16 shows a cross-sectional view of the driving component 201, and the magnetic flux flow.

Firstly, by causing the excitation by supplying the current in the circular coil 204A (or 204B), magnetic flux flow (magnetic circuit) 251A (or 251B) in a path of the magnet core 221A (or 221B), the magnet core 231, and the magnet core 221A (or 221B) is formed. Here, by the magnetic fields of the first magnet 232A, the second magnet 232B, the third magnet 233A and the fourth magnet 233B, magnetic flux flow (magnetic circuit) 205A (or 205B) is formed. The magnetic circuits 251A, 251B, 205A, 205B interact with each other, and as a result, torque is generated in the rotor 203.

According to the transverse flux machine 210, the radius of the transverse flux machine can be increased, and the facing area of the stator 202 and the rotor 203 can be increased in proportion of the square of radius. Therefore, even if the transverse flux machine is flat, higher torque can be achieved.

[Fourth Embodiment]

FIGS. 17 to 20 are drawings for explaining a driving system of a transverse flux machine 401 according to a fourth embodiment.

Figure 17:
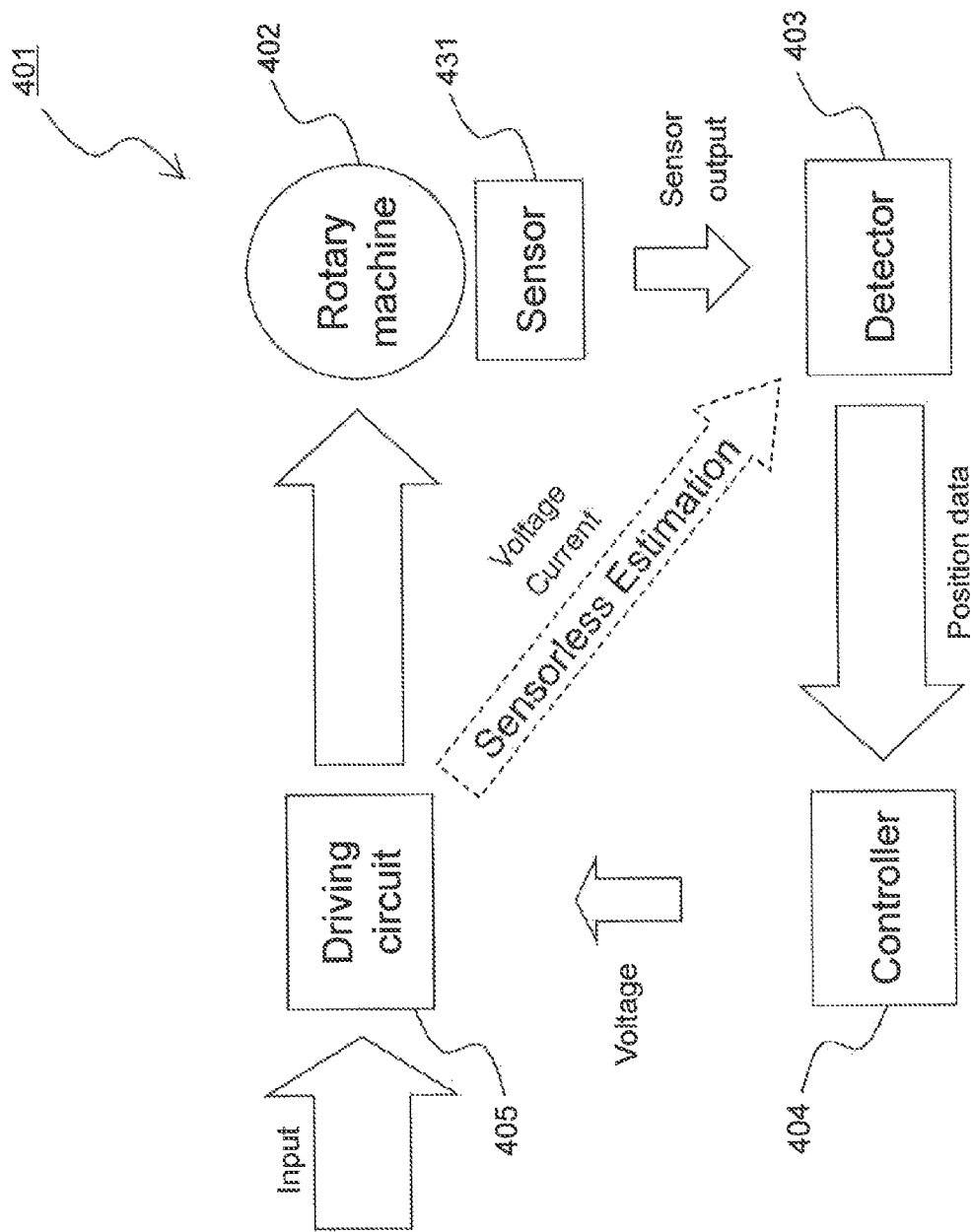
FIG. 17 shows a block diagram showing a driving system of a transverse flux machine according to a fourth embodiment.

In FIG. 17, the driving system of the transverse flux machine 401 includes the transverse flux machine (rotary machine) 402 of the first embodiment, a detector 403 of rotational position, a controller 404 of rotating, and a driving circuit 405. Here, the controller 404 and the driving circuit 405 are a controlling unit 410 together. The detector 403 detects rotational position of the rotor 3 based on the output from a sensor 431 mounted on the driving axis of the rotary machine 402, or detects rotational position of the rotor based on the output from the driving circuit 405 and the physical model of the rotary machine 402. The controller 404 obtains the position data from the detector 403, and applies the voltage to the driving circuit 405 based on the controlling algorithm implemented. Then, the driving circuit 405 supplies the current to a circular coil 421 (FIG. 18) (corresponding to the coil 4 of the first embodiment), and as a result, torque is generated in the rotor. That is, the driving circuit 405 controls an amount of current to the circular coil 421.

Figure 18:
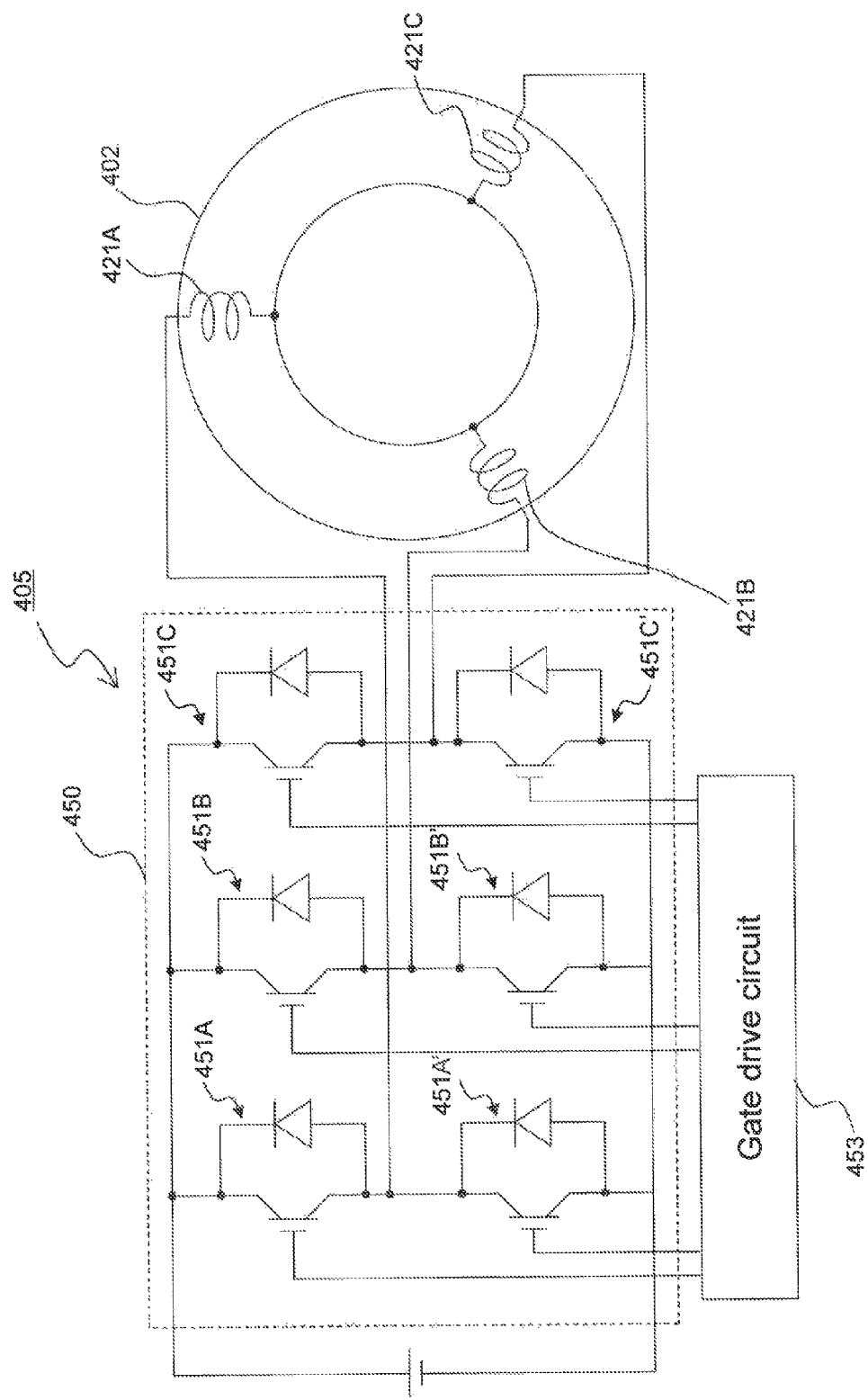
FIG. 18 shows a block diagram showing a driving circuit of FIG. 17.

In FIG. 18, the driving circuit 405 includes a switching circuit 450 and a gate drive circuit 453. The switching circuit 450 includes switching units 451A-451C and 451A'-451C' connected with the circular coils 421A-421C of each phase by three-phase bridge circuit. The switching circuit 450 is driven by pulse signals from the gate drive circuit 453, and rotational speed is controllable by the frequency of the pulse signals. Here, the switching circuit 450 has, for example, IGBTs (Insulated-gate bipolar transistors) and diodes.

Furthermore, although the driving circuit 405 including three-phases coils 421 is showed in FIG. 18, the driving circuit 405 including different-phase coil is applicable. In this case, the switching circuit 450 including the switching unit(s), the same in number as the number of the phase(s), is used.

Furthermore, if the rotor 3 rotates at a regular (or almost regular) rotational speed, the rotor 3 can be driven by supplying polyphase current with the frequency corresponding to the rotational speed without the switching circuit 450.

Figure 19:
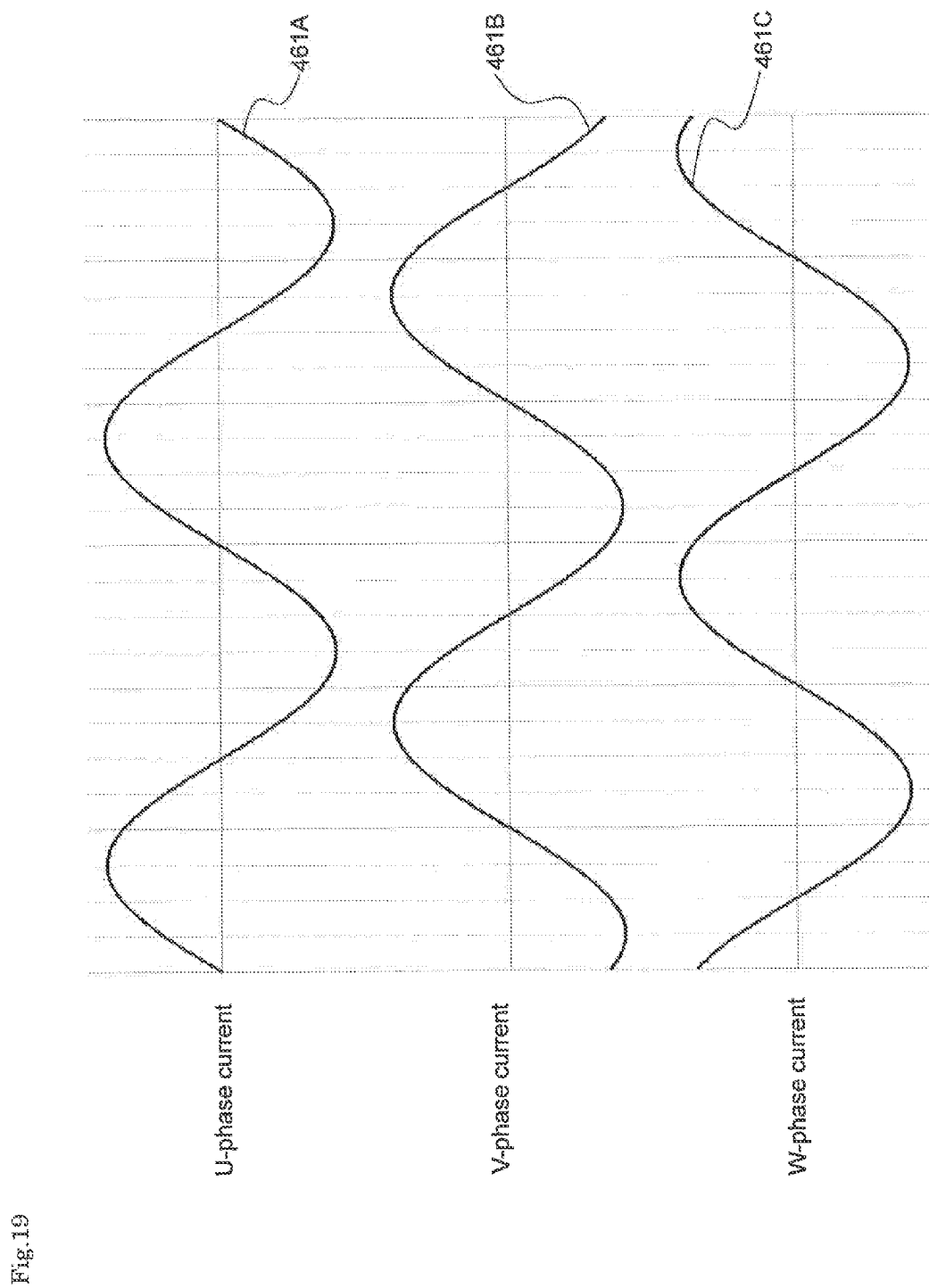
FIG. 19 shows a drawing showing polyphase current as sine wave according to the fourth embodiment.
Figure 20:
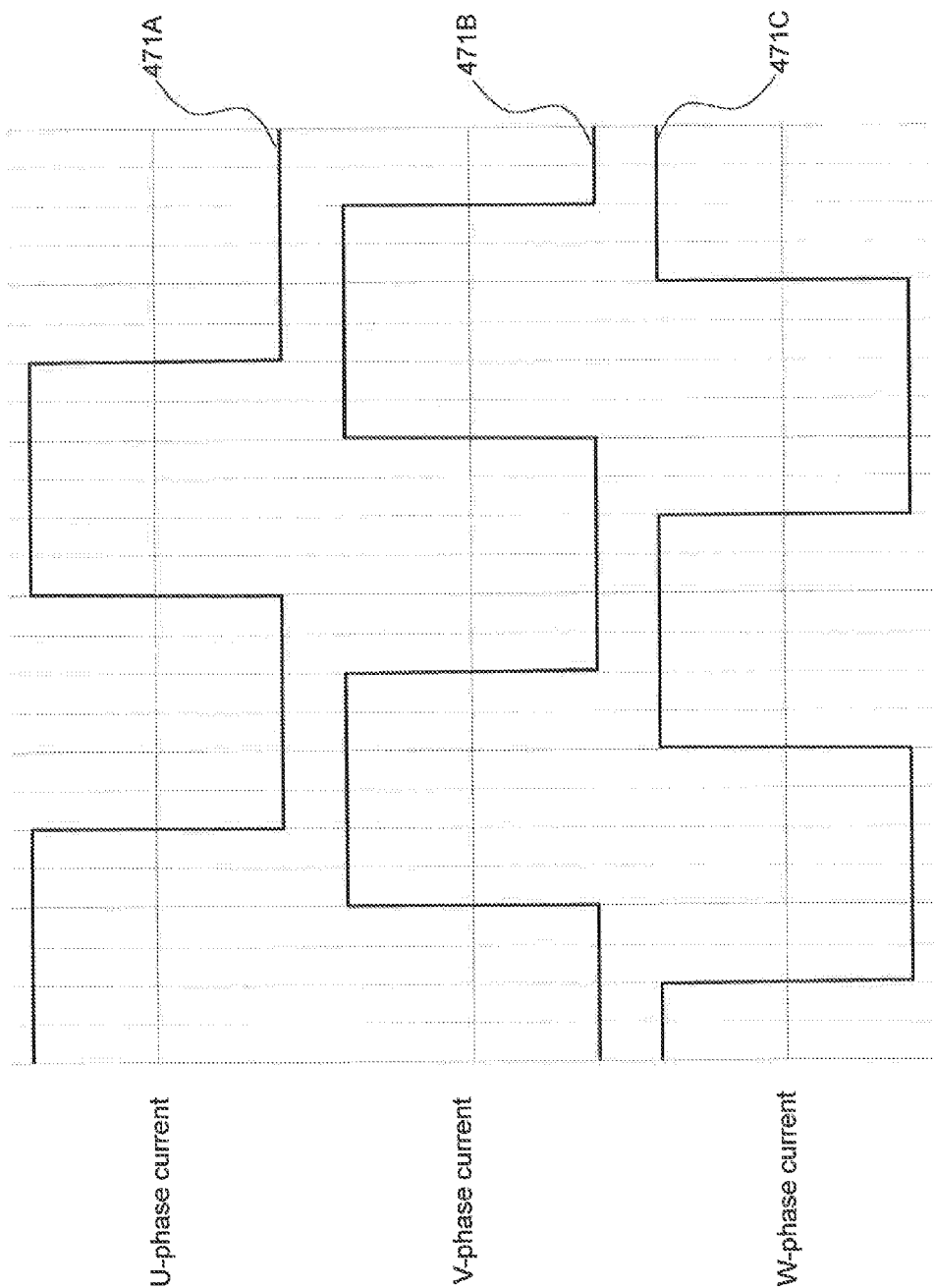
FIG. 20 shows a drawing showing polyphase current as square wave according to the fourth embodiment.

FIG. 19 and FIG. 20 show polyphase (three-phase) current to three-phase coil 421. FIG. 19 shows the three-phase current phases 461A-461C when PNM (Pulse Width Modulation) control is applied to the switching circuit 450. Practically, although the three-phase current includes the noise, FIG. 19 shows only the components of fundamental waves, which phases are shifted from each other by 120 deg. The rotor is driven as the rotational speed corresponding to the frequency of the fundamental wave. Moreover, FIG. 20 shows the three-phase current phases 471A-471C when pulse control is applied to the switching circuit 450. The three-phase current phases 471A-471C are square waves, which phases are shifted from each other by 120 deg.

[Operations of the Fourth Embodiment]

According to the driving system 401 applied to the transverse flux machine of any of the embodiments, stable rotation of the rotor can be performed with control that is relevant to rotational position of the rotor. Moreover, in the transverse flux machine, the number of phases can be defined at its option, and the transverse flux machine can be driven by PWM control, or control that is the same as the control applied to PM (Permanent Magnet) motor or hybrid-stepper motor, generally.

[Fifth Embodiment]

A vehicle of a fifth embodiment includes the transverse flux machine (rotary machine) of the first embodiment. The vehicle described herein refers, e.g., to a two to four-wheeled hybrid electric vehicle, a two to four-wheeled electric vehicle, a motor-assisted bicycle, and the like.

Figure 21:
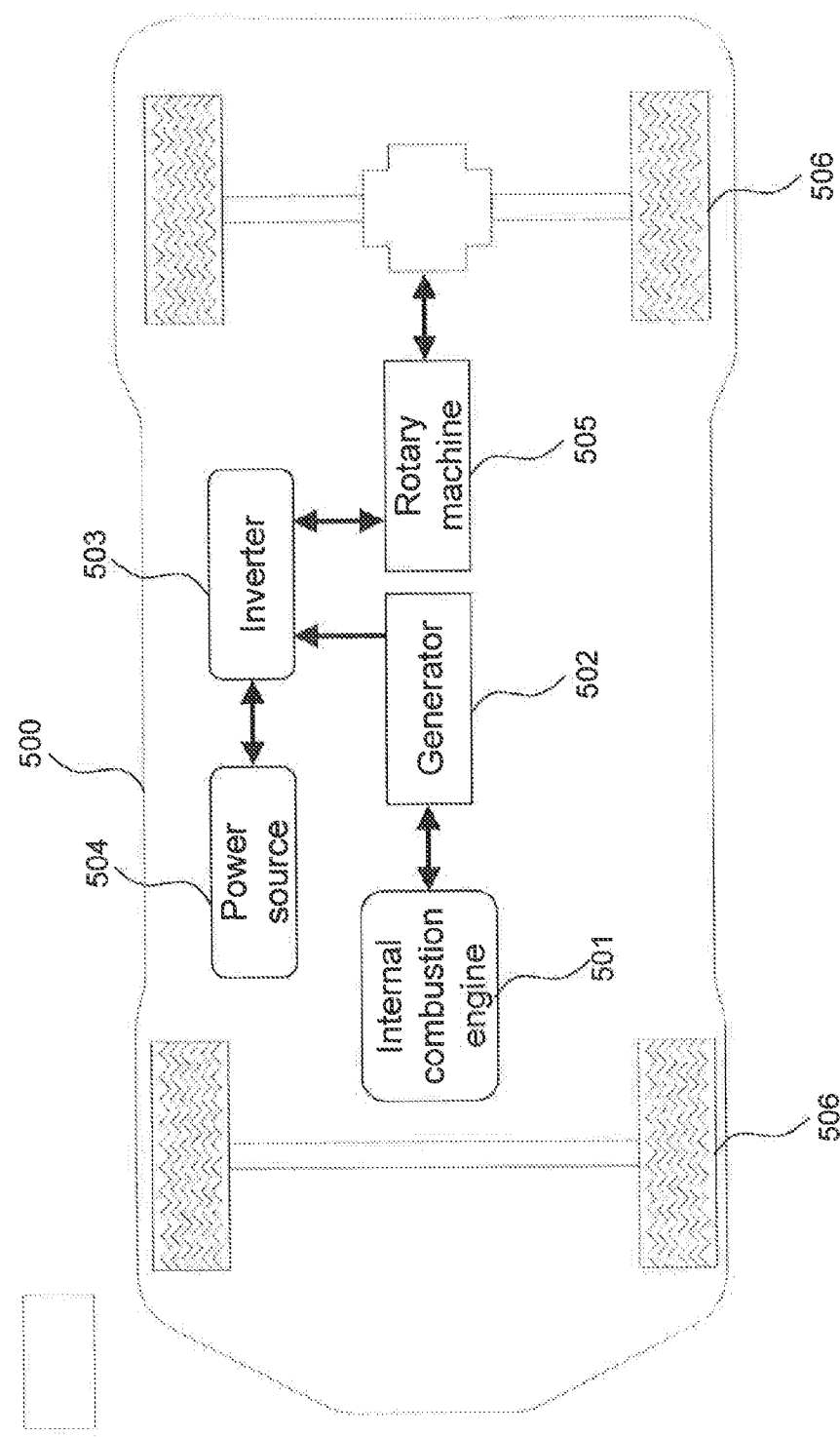
FIG. 21 shows a schematic diagram showing a series hybrid vehicle according to a fifth embodiment.
Figure 22:
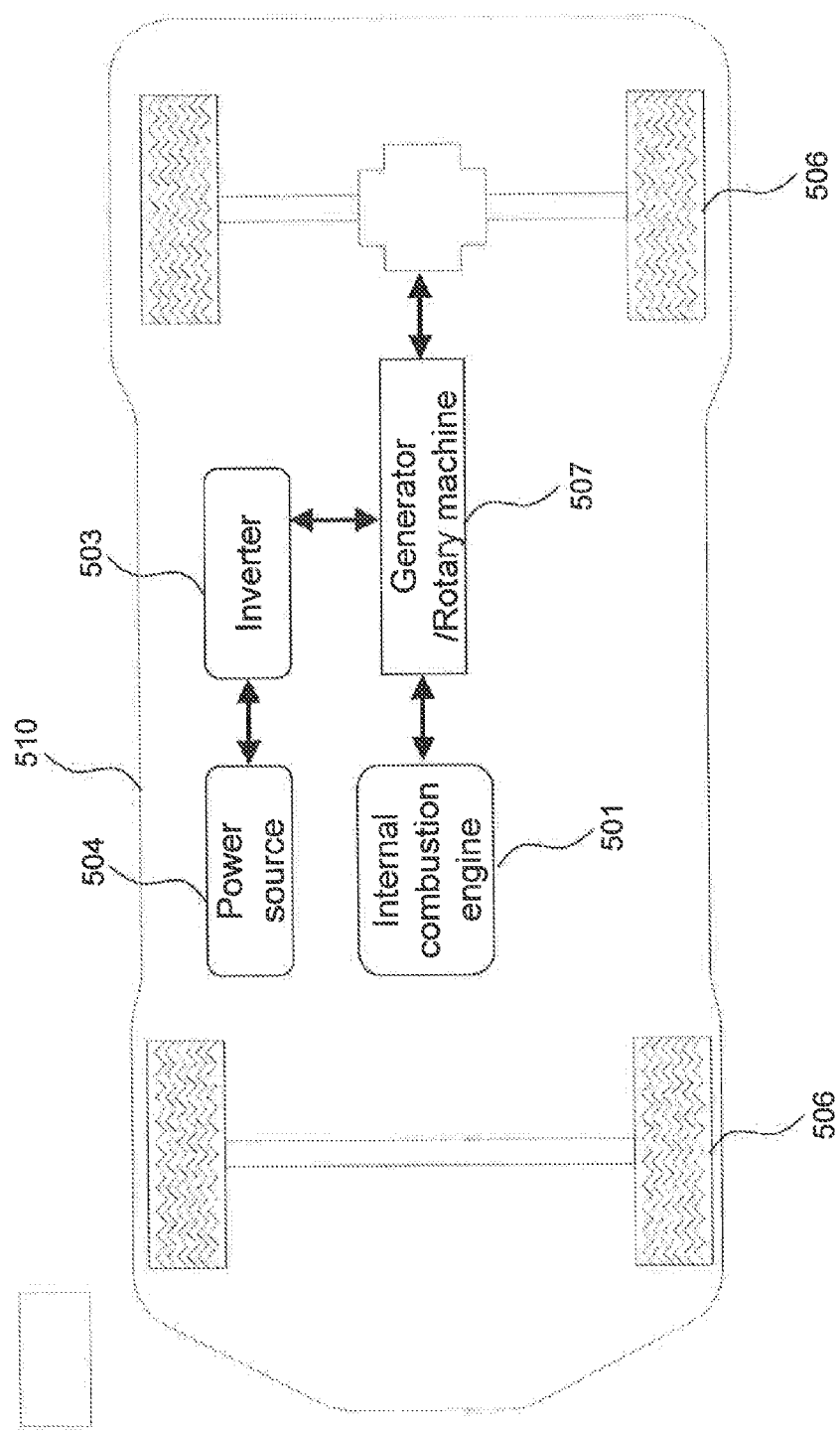
FIG. 22 shows a schematic diagram showing a parallel hybrid vehicle according to the fifth embodiment.
Figure 23:
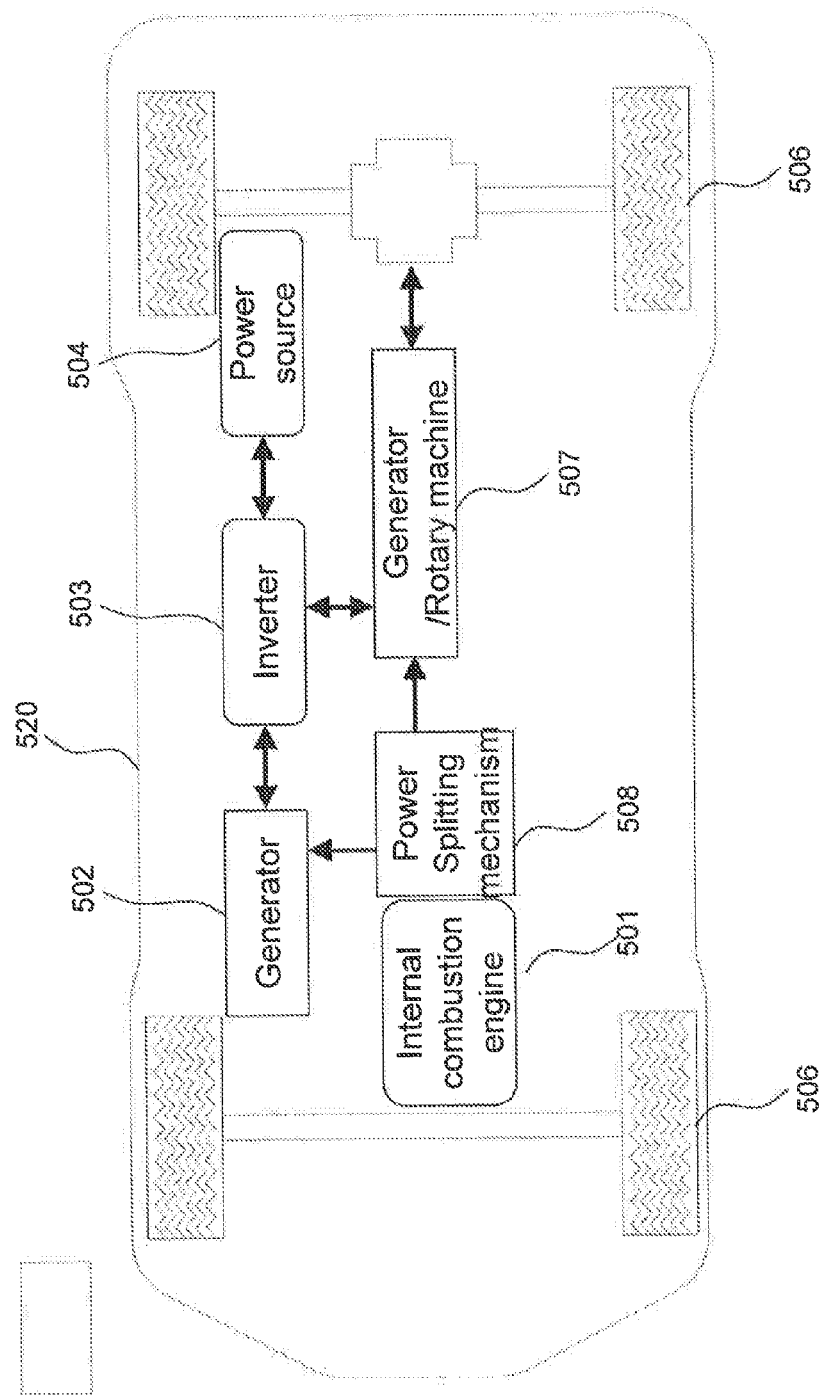
FIG. 23 shows a schematic diagram showing a series-parallel hybrid vehicle according to the fifth embodiment.
Figure 24:
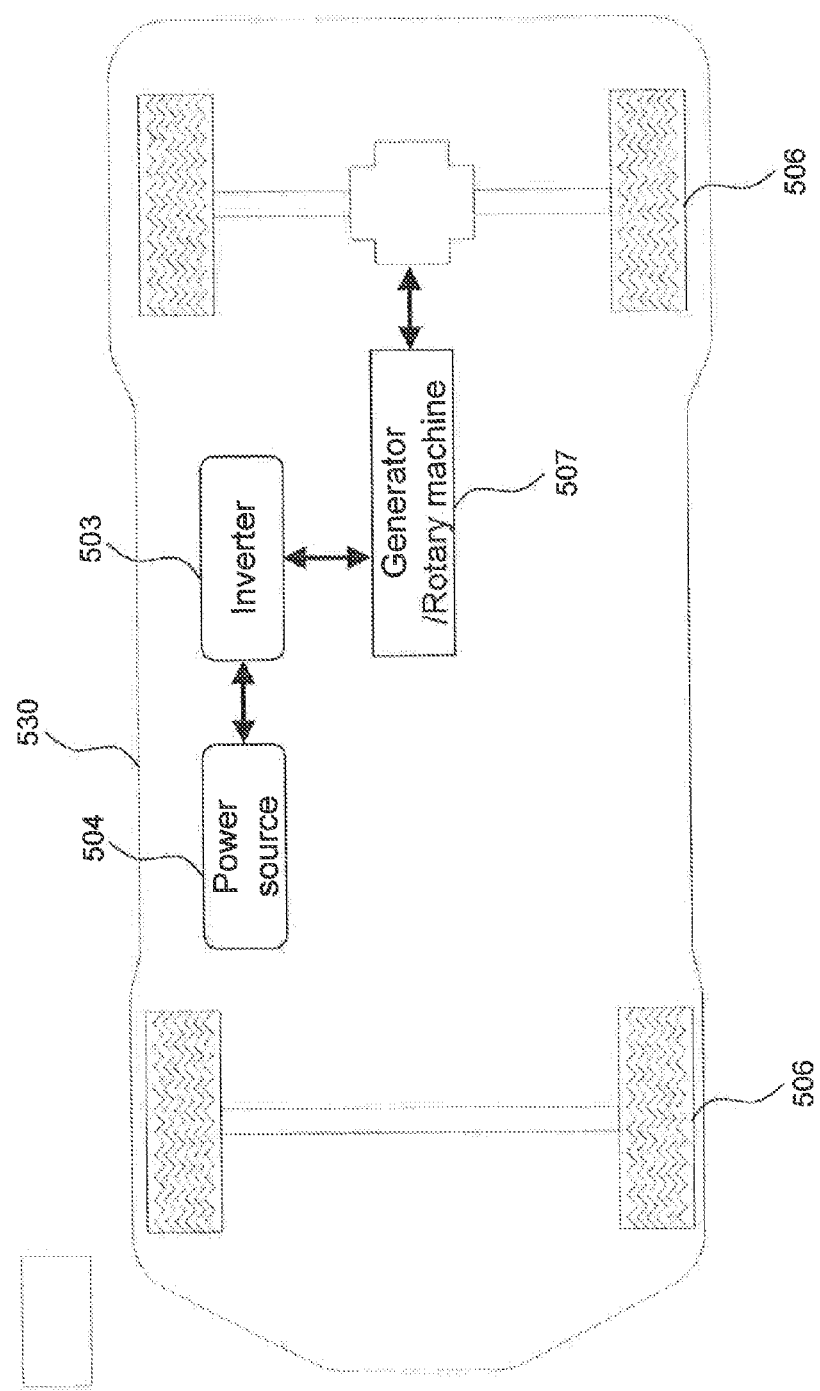
FIG. 24 shows a schematic diagram showing an electric vehicle according to the fifth embodiment.

FIGS. 21 to 23 show hybrid type vehicles in which an internal combustion engine and a battery-powered rotary machine are combined as a running power source. FIG. 24 shows an electric vehicle having the battery-powered rotary machine as the running power source. As driving force of the vehicle, a power source having wide ranges of engine speed and torque depending on the running conditions are necessary. Generally, the internal combustion engine is limited as to its torque and engine speed by which ideal energy efficiency can be performed, the energy efficiency decreases in driving conditions other than the above. In the hybrid type vehicle, the energy efficiency of the entire vehicle can be improved by the internal combustion engine at an optimal condition to generate electricity, and driving wheels with a high-efficiency rotary machine, or by driving in combination the power of the internal combustion engine and the rotary machine. Furthermore, by regenerating the kinetic energy of the vehicle upon moderation as electric power, mileage per a unit fuel can be dramatically increased compared to a vehicle using only the typical internal combustion engine.

The hybrid vehicle can roughly be categorized into three types depending on how the internal combustion engine and the rotary machine are combined.

FIG. 21 shows a hybrid vehicle 500 that is generally called a series hybrid vehicle. In the hybrid vehicle 500, the entirety of power of internal combustion engine 501 is once converted into electric power by the generator 502, and this electric power is charged in a battery pack (power source) 504 through an inverter 503. The electric power in the battery pack 504 is supplied to a rotary machine 505 of the first embodiment through the inverter 503, and wheels 506 are driven by the rotary machine 505. According to the hybrid vehicle 500, the internal combustion engine 501 can be driven under a high efficiency condition, and the regeneration of electric power is also possible.

FIG. 22 shows a hybrid vehicle 510 that is called a parallel hybrid vehicle. In FIG. 22, reference number 507 denotes the rotary machine of the first embodiment that serves also as the generator. The internal combustion engine 501 primarily drives the wheels 506, converts a part of its power to electric power by the rotary machine 507 depending on the situation, and the battery pack 504 is charged by the electric power. The rotary machine 507 supports the driving force upon departure or acceleration, with increasing load. According to the hybrid vehicle 510, high-efficiency can be achieved by reducing the changes in the load of the internal combustion engine 501, and the regeneration of electric power is also possible. Moreover, since the driving of the wheels 506 is primarily performed by the internal combustion engine 501, the output of the rotary machine 507 can be determined optionally according to a proportion of the required support. The hybrid vehicle 510 can be configured even by using a relatively small rotary machine 507 and battery pack 504.

FIG. 23 shows a hybrid vehicle 520 that is called a series-parallel hybrid vehicle. It has a scheme in which both the series and the parallel are combined. A power splitting mechanism 508 splits the output of the internal combustion engine 501 for generating electricity and for driving wheels. The load control of the engine can be performed more delicately than the parallel scheme, and the energy efficiency can be increased.

FIG. 24 shows an vehicle 530 that is an electric vehicle. In FIG. 24, reference number 507 denotes the rotary machine of the first embodiment that serves also as the generator. The rotary machine 507 drives the wheels 506, converts into electric power as the rotary machine 507 depending on the situation, and the battery pack 504 is charged by the electric power.

These embodiments are presented merely as examples, and do not intend to limit the scope of the claims. These embodiments are capable of being carried out in various other embodiments, and various abbreviations, replacements, and modification thereof can be made within a scope that does not go beyond the essence of the invention. For example, in the vehicle of the fifth embodiment, transverse flux machines of other embodiments as substitute for the transverse flux machine of the first embodiment may be used.

Further, these embodiments and modifications thereof are included in the scope and essence of the invention, and at the same time, are included in the invention described in the claims and a scope of equivalents thereof.

What is claimed is:

1. A transverse flux machine comprising:
    a stator including a circular coil wound in a rotational direction, and a plurality of first ferromagnets surrounding a part of the circular coil in the rotational direction; and
    a rotor arranged to face the first ferromagnets across a gap, the rotor being rotatable about a center axis of the circular coil relative to the stator;
    wherein the rotor includes:
    a plurality of second ferromagnets arranged in the rotational direction; and
    a first member and a second member arranged opposite to the first member in the rotational direction, the first member and the second member being inserted between two adjacent second ferromagnets in the rotational direction, the first member and the second member respectively generating two magnetic fields opposite to each other in the rotational direction.

2. The transverse flux machine according to claim 1, further comprising:
    a third ferromagnet arranged between the first member and the second member.

3. The transverse flux machine according to claim 2, wherein the third ferromagnet has an anisotropy characteristic in part.

4. The transverse flux machine according to claim 1, further comprising:
a third member arranged between the first member and the second member, the third member generating a magnetic field in a radial direction relative to the center axis.

5. The transverse flux machine according to claim 1, further comprising:
a third member arranged in an outer circumference of the first member and the second member, the third member generating a magnetic field in a radial direction relative to the center axis.

6. The transverse flux machine according to claim 1, wherein the stator is arranged to face an inner circumference of the rotor.

7. The transverse flux machine according to claim 6, wherein the stator is a first stator, the transverse flux machine further comprising:
a second stator arranged to face an outer circumference of the rotor.

8. The transverse flux machine according to claim 7, wherein the first stator and the second stator are arranged so that the first ferromagnets of the first stator differ from the first ferromagnets of the second stator in a rotational position.

9. The transverse flux machine according to claim 1, wherein any of the first ferromagnets and the second ferromagnets has an anisotropy characteristic in part.

10. The transverse flux machine according to claim 1, further comprising:
a detector to detect a rotational position of the rotor, and generate position data; and
a controlling unit configured to obtain the position data and to control an amount of current to the circular coil based on the position data.

11. A transverse flux machine comprising:
a plurality of pairs of a stator and a rotor, whose relative position relations between the stator and the rotor in a rotational direction are different,
wherein the stator includes a circular coil wound in the rotational direction, and a plurality of first ferromagnets surrounding a part of the circular coil in the rotational direction, and
wherein the rotor is arranged to face the first ferromagnets included in the stator paired with the rotor across a gap, the rotor is rotatable about a center axis of the circular coil relative to the stator paired with the rotor, the rotor includes a plurality of second ferromagnets arranged in the rotational direction, a first member, and a second member arranged opposite to the first member in the rotational direction, the first member and the second member are inserted between two adjacent second ferromagnets in the rotational direction, and the first member and the second member respectively generate two magnetic fields opposite to each other in the rotational direction.

12. A vehicle comprising: the transverse flux machine according to claim 1.

13. The vehicle according to claim 12, wherein the transverse flux machine further comprises:
a detector to detect a rotational position of the rotor, and to generate position data; and
a controlling unit configured to obtain the position data and to control an amount of current to the circular coil based on the position data.

14. The vehicle according to claim 13, further comprising:
a power source to output electric power; and
an inverter to convert the electric power;
wherein the transverse flux machine is operated by the electric power converted by the inverter.

15. A transverse flux machine comprising:
a first stator;
a second stator;
each of the first and second stators including a circular coil wound in a rotational direction, and a plurality of first ferromagnets surrounding a part of the circular coil in the rotational direction; and
a rotor arranged to face the first ferromagnets across a gap, the rotor being rotatable about a center axis of the circular coil relative to the first and second stators;
the rotor including
a plurality of second ferromagnets arranged in the rotational direction so that the second ferromagnets face the first ferromagnets in a direction parallel to the rotational axis; and
a first member and a second member arranged opposite to the first member in the rotational direction, the first member and the second member being inserted between two adjacent second ferromagnets in the rotational direction, the first member and the second member respectively generating two magnetic fields opposite to each other in the rotational direction.

16. The transverse flux machine according to claim 15, further comprising:
a third ferromagnet arranged between the first member and the second member.

17. The transverse flux machine according to claim 15, further comprising:
a third member arranged between the first member and the second member, the third member generating a magnetic field in a radial direction relative to the center axis.

18. The transverse flux machine according to claim 15, wherein the first stator and the second stator are arranged so that the first ferromagnets of the first stator differ from the first ferromagnets of the second stator in a rotational position.

19. The transverse flux machine according to claim 15, wherein any of the first ferromagnets and the second ferromagnets has an anisotropy characteristic in part.

20. The transverse flux machine according to claim 15, further comprising:
a detector to detect a rotational position of the rotor, and generate position data; and
a controlling unit configured to obtain the position data and to control an amount of current to the circular coil based on the position data.

* * * * *